(12) United States Patent
Inubushi

(10) Patent No.: US 6,859,416 B2
(45) Date of Patent: Feb. 22, 2005

(54) APPARATUS AND METHOD FOR ANALYZING CORRELATION BETWEEN GEOPHYSICAL DATA AND SEISMIC DATA, GEOPHYSICAL DATA MONITORING APPARATUS AND METHOD, AND EARTHQUAKE MONITORING METHOD

(76) Inventor: Hiroyuki Inubushi, 25-57, Musashidai 1-chome, Fuchu-shi, Tokyo (JP), 183-0042

( * ) Notice: Subject to any disclaimer, the term of this patent is extended or adjusted under 35 U.S.C. 154(b) by 0 days.

(21) Appl. No.: 10/459,565

(22) Filed: Jun. 12, 2003

(65) Prior Publication Data

US 2004/0093161 A1 May 13, 2004

Related U.S. Application Data

(63) Continuation of application No. PCT/JP01/10916, filed on Dec. 12, 2001.

(30) Foreign Application Priority Data

Dec. 12, 2000 (JP) ........................................ 2000-378123

(51) Int. Cl.[7] .............................. G01V 1/00; G01V 1/28
(52) U.S. Cl. .............................. 367/14; 367/40; 367/59; 702/14; 702/15
(58) Field of Search ............................... 702/14, 15, 1, 702/3; 367/14, 37, 40, 59; 340/690; 175/40

(56) References Cited

U.S. PATENT DOCUMENTS

| | | | | |
|---|---|---|---|---|
| 4,050,067 A | * | 9/1977 | Elmore, Jr. ................. | 342/191 |
| 5,675,081 A | * | 10/1997 | Solheim et al. ........... | 73/170.28 |
| 5,783,945 A | * | 7/1998 | Balbachan ................... | 324/348 |
| 5,838,157 A | * | 11/1998 | Balbachan ................... | 324/348 |
| 5,884,226 A | * | 3/1999 | Anderson et al. .............. | 702/3 |
| 5,974,875 A | * | 11/1999 | Leslie et al. ............. | 73/170.07 |
| 6,035,710 A | * | 3/2000 | Hutchison et al. ....... | 73/170.16 |
| 6,622,093 B1 | * | 9/2003 | Fujinawa et al. ............. | 702/15 |

FOREIGN PATENT DOCUMENTS

| | | | |
|---|---|---|---|
| JP | 63-246494 | * | 10/1988 |
| JP | 11174158 | * | 7/1999 |
| JP | 78513 | * | 11/1999 |
| JP | 147140 | * | 5/2000 |
| WO | 9818025 | * | 4/1998 |

OTHER PUBLICATIONS

Woith et al, physico–chemical behavior . . . Turkey, Nuovo Cimento C, vol. 22C, No. 3–4, PP 387–391, 6/99; abstract on herewith.*

Srivastava, K, A study of the subsurface . . . approach, Ann. Geotherm. Resources Counc. Mtg., vol. 25, PP 439–441.*

Iinubishi et al, Data mining report for air temperature change . . . earthquake, Aug. 7, 2002, SICE Conf., vol. 5, pp 2931–2935; abstract only herewith.*

* cited by examiner

*Primary Examiner*—Ian J. Lobo
(74) *Attorney, Agent, or Firm*—Wenderoth, Lind & Ponack, L.L.P

(57) ABSTRACT

The present invention relates to an apparatus and a method for analyzing the correlation geophysical data and seismic data, physical data monitoring apparatus and method, and an earthquake monitoring method.

5 Claims, 47 Drawing Sheets

FIG. 4

ANALYSIS PERIOD: JANUARY 1, 1990 TO DECEMBER 31, 2001
ANALYSIS LOCATION: HOKKAIDO

TIMINGS WITH WHICH A DATABASE A OCCURRED IN THE 10 CASES LISTED BELOW. IN SIX CASES THEREOF, EARTHQUAKES OF M6 OR HIGHER.

| Strict Conformance (Red) | Non-conformance (No Color Change) |
|---|---|
| Non-conformance (No Color Change) | Satisfactory Conformance (Orange) |

FIG. 11

**GEOPHYSICAL DATA
(ANY ONE OF THE FOLLOWING DATA)**

- GEODESIC DATA
- METEOROLOGICAL DATA
- ELECTROMAGNETICS DATA
- ATMOSPHERIC IONIZATION DATA
- ATMOSPHERIC ION DENSITY DATA
- AE WAVE DATA
- GAMMA-RAY AMOUNT DATA
- GROUNDWATER RADON CONCENTRATION DATA
- EARTHQUAKE-SOUND DATA
- EARTH SURFACE TEMPERATURE DATA
- GROUNDWATER LEVEL DATA

| POSITION INFORMATION | ELECTROMAGNETIC WAVE NOISE COUNT PER UNIT TIME |
|---|---|
| TOKYO | 70 |
| NAGOYA | 650 |
| OSAKA | 40 |
| ⋮ | ⋮ |

31

| Position information | Date; Time Atmospheric | Temperature | Humidity |
|---|---|---|---|
| Tokyo | Dec. 1; 01 O'clock | 3.5°C | 30.1% |
| Tokyo | Dec. 1; 14 O'clock | 10.2°C | 27.2% |

FIG. 21

```
GEOPHYSICAL DATA (PLURAL)

• DATA WITH SHORT TIME SPAN BEFOR
  EARTHQUAKE

• DATA WITH LONG TIME SPAN BEFOR
  EARTHQUAKE
```

Probability of Earthquake Occurrence
When Temperature and Humidity in
Tokyo Have Taken Specific pattern
= 5/10 Times = 50%

Occurrence-Date Probabilities for 5
Times of Earthquake Occurrences
When Temperature and Humidity of
Tokyo Have Taken Specific Pattern:

After 9 Days = 2/5 Times = 40%
After 10 Days = 1/5 Times = 20%
After 11 Days = 0/5 Times = 0%
After 12 Days = 0/5 Times = 0%
After 13 Days = 1/5 Times = 20%
After 14 Days = 1/5 Times = 20%

December 10, 2000

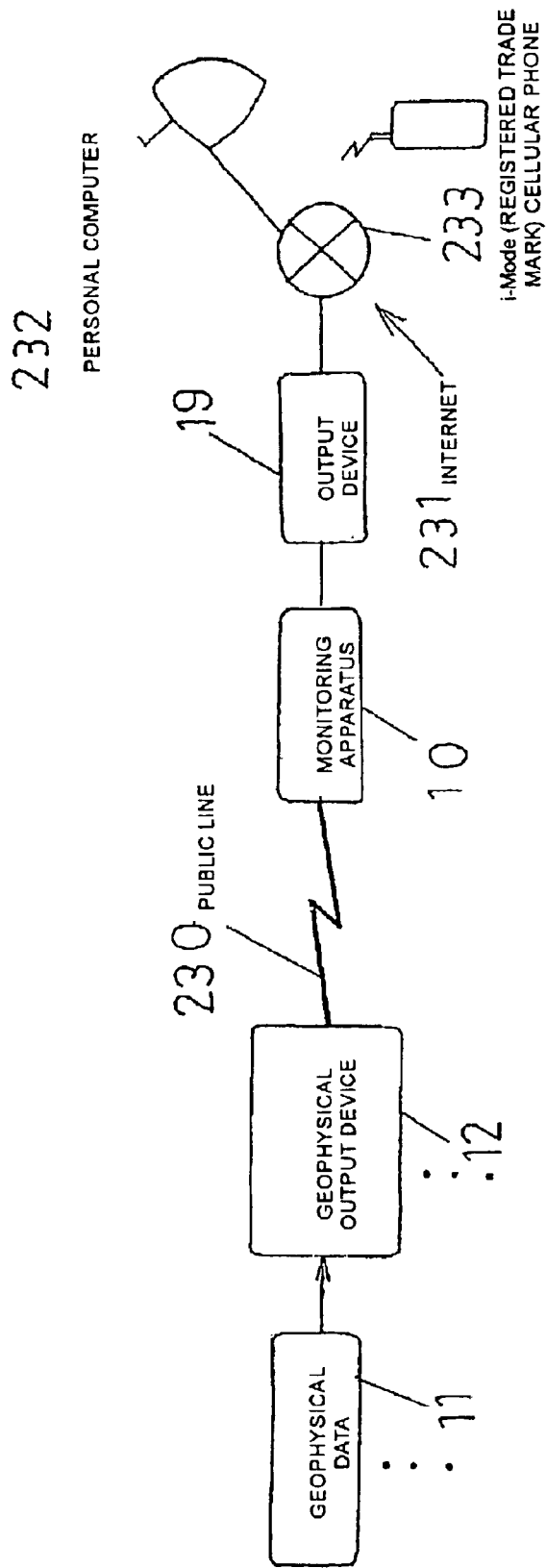

FIG 37

■ Earthquake Prediction

To: Earthquake-Prediction Receivers

The following are presented as predictions of the current time:

1. Location          (Ibaragi Pref. - Fukushima Pref.) Offshore
2. Time              December 12, 2001 ±2 Days
3. Magnitude Scale   M5.5 ±0.3

Remarks

- From KURUDAS Observation Data
- Probability of Earthquake Occurrence When Precursor Appeared = 5/10 Times = 50%
- Occurrence-Date Probabilities for 5 Times of Earthquake Occurrences after a Precursor Has Appeared in the Location:

After 9 Days = 2/5 Times = 40%
    After 10 Days = 1/5 Times = 20%
    After 11 Days = 0/5 Times = 0%
    After 12 Days = 0/5 Times = 20%
    After 13 Days = 1/5 Times = 20%

Transmitted Date & Time   December 1, 2001; 12:00

FIG 38

■ Earthquake Prediction Information Delivery Site

A prediction released at 12:00 O'clock, December 1, 2001 is presented below.

1. Location          (Ibaragi Pref. - Fukushima Pref.) Offshore
2. Time              December 12, 2001 ±2 Days
3. Magnitude Scale   M5.5 ±0.3

Remarks

- From KURUDAS Observation Data
- Probability of Earthquake Occurrence When Precursor Appeared = 5/10 Times = 50%
- Occurrence-Date Probabilities for 5 Times of Earthquake Occurrences When a Precursor Has Appeared in the Location:

After 9 Days = 2/5 Times = 40%
    After 10 Days = 1/5 Times = 20%
    After 11 Days = 0/5 Times = 0%
    After 12 Days = 0/5 Times = 20%
    After 13 Days = 1/5 Times = 20%

FIG 39

■ Earthquake Prediction Information Delivery Site

Enter your ID name and password. → ID Name    [    ]

Password    [    ]

> The following is displayed when the membership number and the password match those registered.

↓

A prediction released at 12:00 O'clock, December 1, 2001 is presented below.

1. Location    (Ibaragi Pref. - Fukushima Pref.) Offshore
2. Time    December 12, 2001 ±2 Days
3. Magnitude Scale    M5.5 ±0.3

Remarks

- From KURUDAS Observation Data
- Probability of Earthquake Occurrence When Precursor Appeared = 5/10 Times = 50%
- Occurrence-Date Probabilities of 5 Times of Earthquake Occurrences When a Precursor Has Appeared in the Location:

After 9 Days = 2/5 Times = 40%
    After 10 Days = 1/5 Times = 20%
    After 11 Days = 0/5 Times = 0%
    After 12 Days = 0/5 Times = 20%
    After 13 Days = 1/5 Times = 20%

FIG 40
 CELLULAR PHONE/PHS
 "POCKET BELL" COMMUNICATION APPARATUS
 WATCH
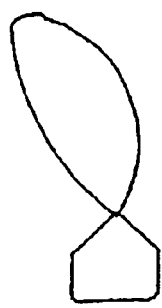 PENDANT
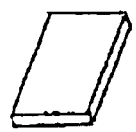 ELECTRONIC POCKET NOTEBOOK/PDA
 PERSONAL COMPUTER

APPARATUS AND METHOD FOR ANALYZING CORRELATION BETWEEN GEOPHYSICAL DATA AND SEISMIC DATA, GEOPHYSICAL DATA MONITORING APPARATUS AND METHOD, AND EARTHQUAKE MONITORING METHOD

This application is a continuation of International Application PCT/JP0110916, with an international filing date of Dec. 12, 2001.

TECHNICAL FIELD

The present invention relates to an apparatus and a method for analyzing the correlation between geophysical data and seismic data, a geophysical data monitoring apparatus and method, and an earthquake monitoring method.

BACKGROUND ART

At present, there are a number of earthquake forecast schemes. Among the schemes, the VAN scheme developed in Greece is world widely known. This scheme forecasts the occurrence of an earthquake through observation of a potential difference, that is, a telluric electrical current, between two locations. In Japan, a plurality of organizations have been engaged in empirical studies and research regarding this scheme. However, it is unknown as of November 2001 as to whether the scheme is ready for practical use. According many opinions, it seems that the scheme is not yet usable at least in Japan where many types of noise, such as that of trains.

In general, it can be said that regrettably no "definitive earthquake forecasts" are possible in the world.

In the field of earthquake forecast, example cases have been reported in which, for example, electromagnetic waves and atmospheric ion densities, are observed as a precursory phenomenon. In an academic view, the correlation between geophysical data and earthquakes needs to be reported; practically, however, the research is in a state where it is difficult to verify the correlation.

Although it is a matter not related to earthquakes, an area meteorological observation system called AMeDAS is popularly known in Japan. AMeDAS stands for Automated Meteorological Data Acquisition System, which is abbreviated to as AMeDAS, hereinbelow. At present in Japan, with AMeDAS, which is the area meteorological observation system, weather is observed for, for example, the rainfall rate automatically, at unmanned weather observation stations installed in 1,300 spots (at spacings at about 17 km). At about 840 (at spacings at about 21 km) of the 1,300 spots, rainfall rates, wind direction/wind speed, temperature, sunshine duration, and the like are observed. In addition, snow depths are observed at 200 spots in heavy snowfall regions.

The observation data are collected in an area meteorological observation center in Tokyo, and are subjected to an automatic edit processing. Thereafter, the data are delivered to individual regional weather stations. In addition, in AMeDAS, the edited data are displayed at the final stage over a two-dimensional map, which is well known in weather forecasts and the like.

Strictly speaking, since AMeDAS serves only as an area meteorological observation system, it does not cover the part of performing visual indication on a map. Generally, however, AMeDAS seems to be known as a "precipitation indication system".

Returning now to the matter of earthquake forecast, in the present situation, none have yet been found that display a "location where an earthquake would occur" on a two-dimensional map. That is, while the display of meteorological data is already implemented through AMeDAS, none that are equivalent to AMeDAS have yet been found to handle earthquake forecast data.

Precursors enabling earthquake forecast include, for example, an electromagnetic phenomenon, a meteorological phenomenon, and an increasing phenomenon in atmospheric ion density. However, even if the individual phenomena are represented as instantaneous values, the representation does not indicate a "location where an earthquake would occur".

The above will be described hereinbelow with reference to the atmospheric temperature by way of example of meteorological factors. Increases in earth surface temperature before the occurrence of a very great earthquake are observed in, for example, Japan, Russia, Mainland China, and the U.S.A. Increase in earth surface temperature is thought to affect even the atmospheric temperature, which is the temperature of a portion 1.5 m above the earth surface. However, an earthquake-occurrence location cannot easily be explicitly indicated in accordance with the atmospheric temperature. That is, the "location where an earthquake would occur" cannot be indicated unless information processing is performed for atmospheric temperature values that are developed as "raw data".

Thus, no technical concepts have arisen from the beginning for implementing display of a location explicitly indicative of the "location where an earthquake would occur". Even if such concepts arose, no disambiguation has been made as to what information processing would implement the display. Thus, while a system for displaying the "location where an earthquake would occur" has been demanded, none has yet been realized.

DISCLOSURE OF INVENTION

The present invention solves the following two major problems:

(1) Implementation of what analyzes correlations between geophysical data and seismic data; and (2) Implementation of what displays a "location where an earthquake would occur".

These will be individually described hereunder.

(1) Implementation of what analyzes correlations between natural-world data and seismic data.

As precursors to an earthquake, electromagnetic waves and atmospheric ion densities have been reported. However, regarding the correlations between geophysical data and seismic data, there are affirmative and objective opinions (pros and cons), and a conclusion has not yet been produced.

The correlations between geophysical data and seismic data are, at present, an academic objective "seismo-electromagnetics". For example, Prof. Nagao Toshiyasu, President, Earthquake Forecast Center, Tokai University, wrote a book entitled "Jishinyochi Kenkyu No Shintenkai" (or, New Development in Earthquake Forecast Researches), introducing to "Researches on Earthquake Forecast using Seismo-Electromagnetic Scheme". (Published on Apr. 25, 2001 by Kinmiraisha).

The seismo-electromagnetics is also being researched by, for example, Prof. Hayakawa Masashi, The University of Electro-Communication, and Prof. Ikeya Motoji, Osaka University.

The correlation between the atmospheric ion density and the earthquake was reported by Prof. Wadatsumi Kiyoshi, Okayama University of Science to, for example, Chikyu Wakusei Kagaku Kanren Gakkai (or, Association of Earth, Planetary and Space Science) and Nippon Jyouho Chishitsu Gakkai (or, Japan Society of Geoinformatics) (in June, 2001). While the research is now in progress, final disambiguation of the correlation is held pending future resolution.

Regarding the correlation between the atmospheric temperature/humidity and the earthquake, Satsuya Taisuke, Ion Jyouho Kenkyusho (or, Japan Association of Ion Research and Application) with a report entitled "H13 (2001) Geiyo Jishin-no Zenchogensho" (or, Precursory Phenomena in "Geiyo Earthquake" in 2001) to Nippon Kisho Gakkai (or, Japanese meteorological association) (on Oct. 12, 2001). Also in this case, however, full-scale disambiguation is held; pending future resolution.

Reasons that research of the earthquake forecast has not drastically advanced are considered to be as follows:

1. Difficulties are involved in indication of correlations between the geophysical data, such as the electromagnetic wave, atmospheric ion density, and atmospheric temperature and humidity, and the earthquake.
2. A large volume of data is involved. The volume is too large to be processed.
3. No effective earthquake forecast algorithm is found.
4. Even if an effective earthquake forecast algorithm was found, no tool is found that is capable of verifying the effectiveness of the algorithm.

In view of these points, the present invention provides an apparatus and a method having the following features:

1. Enabling efficient analysis of correlations between various geophysical data and an earthquake;
2. Enabling even a large amount of data to be searched without causing a problem; and
3. Implementing what displays an "earthquake forecast algorithm considered effective" to be efficiently searched or improved.

(2) Implementation of what displays an earthquake occurrence location on a map.

The following three factors are said to be essential for earthquake forecast:
1. Earthquake occurrence time;
2. Earthquake occurrence location; and
3. Earthquake magnitude scale.

Earthquake forecast is said to be impossible without these three factors. In the inventor's personal view, the "earthquake occurrence location" is considered to probably be most essential among the three factors for earthquake forecast. The reason is that, even with the time and magnitude scale being ambiguous, if the location is unambiguous, at least disaster-prevention related people, businesses, and residents in the location can do "spiritual preparation".

For example, immediately after a great earthquake, a gas-service business would organize a first-class emergency structure. In this case, however, if the earthquake occurrence location were preliminarily known, the business would be able to do "spiritual preparation" against an emergency. Further, the business would be able to organize an emergency structure. Thus, it enables personnel positioning, and simultaneously, enables physical provisions to be made. It can be said that to be able to do "spiritual preparation" would be advantageous also for disaster-prevention related people and other residents.

In contrast, assume a case where the "earthquake-occurrence location" is unambiguous. Even with forecasted factors such as the time and magnitude scale, if the location is unknown, no countermeasures could be taken in individual regions across a whole country, and no way of taking countermeasures would be available.

In view of the above, paying attention to the "earthquake occurrence location," the present invention provides an earthquake forecast apparatus and an earthquake forecast method that performs visual indication of an earthquake occurrence location, which has not been implemented conventionally. Further, by performing the visual indication of an earthquake occurrence location, the present invention enables computation of an earthquake occurrence probability in the location. Furthermore, the present invention displays a method for providing earthquake forecast information in accordance with the computation result.

As already described above, the present invention solves the two major problems listed below:
(1) Implementation of what analyzes correlations between geophysical data and seismic data; and
(2) Implementation of what displays an earthquake occurrence location.

In order to solve these problems, the present invention is configured as described hereunder.

Geophysical data monitoring apparatus proposed by the present invention is characterized by including geophysical data input means that inputs atmospheric temperature data of a plurality of locations as geophysical data of the plurality of locations via a data input device; an atmospheric-temperature-data/position-information correlating section for performing processing that adds position information of a location where the atmospheric temperature data has been detected to the atmospheric temperature data and that correlates the atmospheric temperature data to the position information; an atmospheric-temperature comparing section that compares an atmospheric temperature of a monitoring location at an arbitrary time after sunset with a nighttime temperature thereof; and output means that adds a processing result of the atmospheric-temperature-data/position-information correlating section to a processing result of the atmospheric-temperature comparing section and that outputs the result to an output device.

The above may also be configured to further include reporting means, in which when the result of the process of comparing an atmospheric temperature of a monitoring location at an arbitrary time after sunset with a nighttime temperature thereof exceeds a predetermined condition, the reporting means provides a report saying to that effect to the outside; and meteorological-information display means that provides a report of meteorological information to the outside.

In the geophysical data monitoring apparatus, the output means may be arranged to be capable of performing image processing that represents processing results of the data processing means in the form of graphical information on a map.

In addition, the output means may be arranged to be capable of performing image processing so that individual earthquake precursory phenomena occurred with geophysical data of two or more types can be identifiably displayed on the map.

Further, the configuration may further include location/number-of-days three dimensional output processing means that performs three-dimensional output processing for a location and the number of days so that the location where an earthquake is forecasted to occur and the number of days before the earthquake occurs are three-dimensionally displayed in the output device.

Further, the configuration may further include number-of-days/depth related output processing section so that the number of days before an earthquake occurs is displayed in the form of a depth on the map in the output device.

Geophysical data monitoring method proposed by the present invention is characterized in that atmospheric temperature data of a plurality of locations is acquired as geophysical data of the plurality of locations via geophysical data input means; an atmospheric-temperature-data/position-information correlating section is used to perform processing that adds position information of a location where the atmospheric temperature data has been detected to the atmospheric temperature data and that correlates the atmospheric temperature data to the position information; an atmospheric-temperature comparing section is used to compare an atmospheric temperature of a monitoring location at an arbitrary time after sunset with a nighttime temperature thereof; and output means is used to add a processing result of the atmospheric-temperature-data/position-information correlating section to a processing result of the atmospheric-temperature comparing section and that outputs the result to an output device.

The above may be arranged such that when the result of the process of comparing an atmospheric temperature of a monitoring location at an arbitrary time after sunset with a nighttime temperature thereof exceeds a predetermined condition, reporting means is used to provide a report saying to that effect to the outside; and meteorological-information display means is used to provide a report of meteorological information to the outside.

In addition, the above may be arranged such that the data processing means performs processing in a manner that position information of a location of which geophysical data is input to the geophysical; and the geophysical data processed using a determination condition for an earthquake forecasted to occur is correlated to the position information.

BRIEF DESCRIPTION OF THE DRAWINGS

Figure 4:
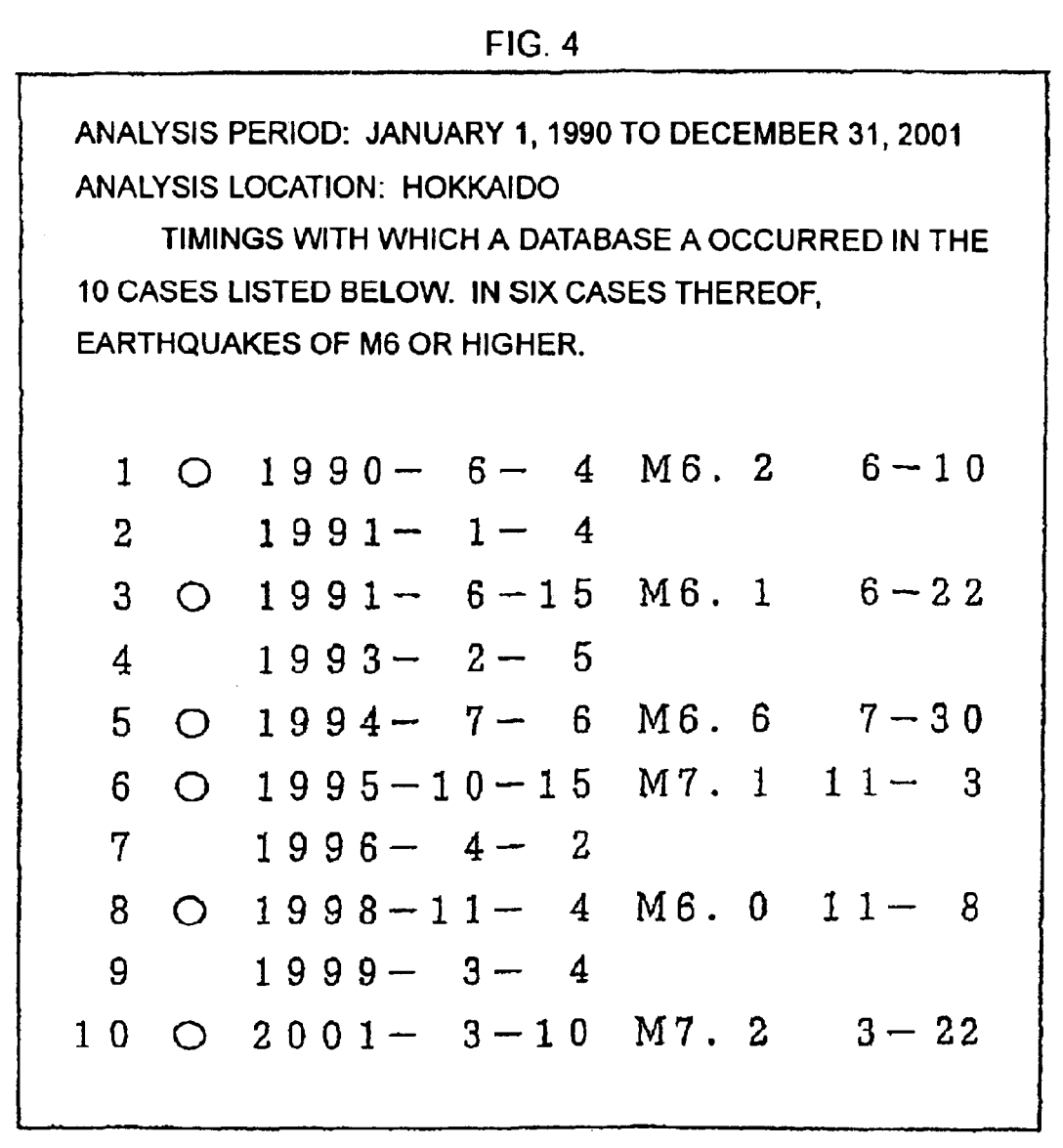

FIG. 4 is a view showing an example output of the result of analysis performed by an analysis technique of the present invention;

FIG. 8 is a view showing an example output as a result of analysis performed by the analysis technique of the present invention, which shows portions representing a factor strictly conforming to conditions of the analysis algorithm, which show portions representing a factor conforming to conditions of the analysis algorithm, and a factor satisfactorily conforming thereto corresponding to levels of the conformance;

FIG. 11 is a view corresponding to a 2nd embodiment of the present invention;

FIG. 14 is a fourth view corresponding to the 2nd embodiment of the present invention;

FIG. 21 is a view corresponding to a 7th embodiment of the present invention;

FIG. 31 is a view corresponding to a 17th embodiment of the present invention;

FIG. 32 is a view corresponding to an 18th embodiment of the present invention;

FIG. 36 is a view corresponding to a 22nd embodiment of the present invention;

FIG. 37 is a view corresponding to a 23rd embodiment of the present invention;

FIG. 38 is a view corresponding to a 24th embodiment of the present invention;

FIG. 39 is a view corresponding to a 25th embodiment of the present invention;

FIG. 40 is a view corresponding to a 26th embodiment of the present invention;

BEST MODE FOR CARRYING OUT THE INVENTION

Individual embodiments of the present invention will be described hereinbelow.

While various types of earthquake forecast techniques are used, the present invention will be discussed with reference to a method using the atmospheric temperature and humidity and a method using electromagnetic waves by way of examples. Additionally, description will partly refer to the atmospheric ion density by way of example. Needless to say, these are only examples, and any other geophysical data may be adapted in principle.

<1st Embodiment>

Figure 10:
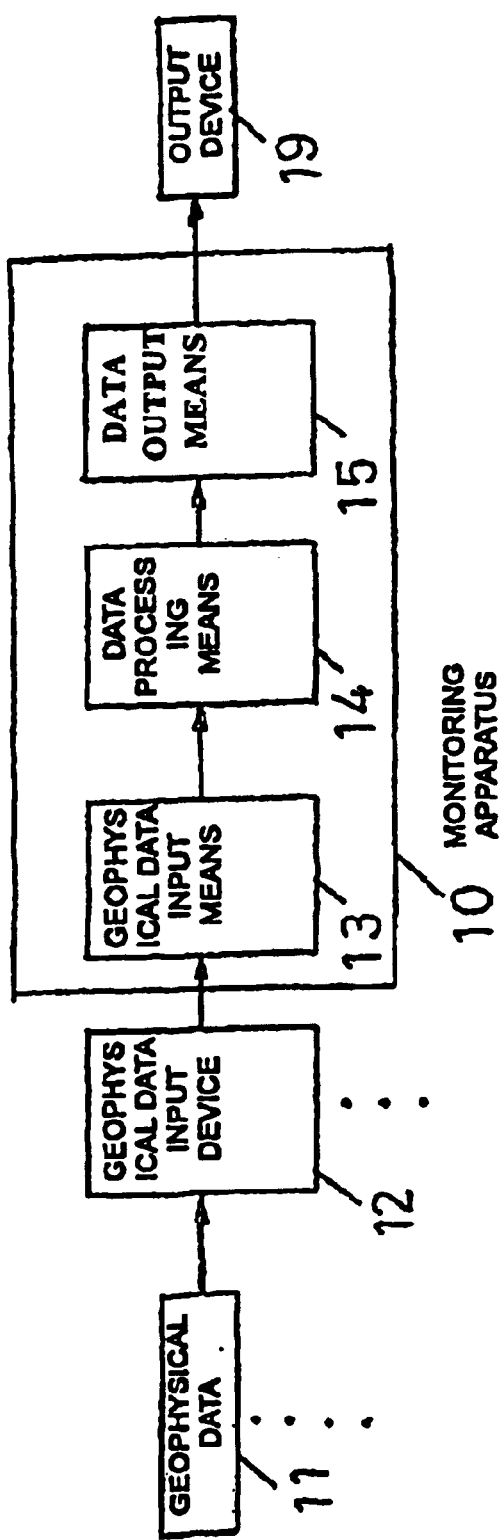
FIG. 10 is a view corresponding to a 1st embodiment of the present invention.

FIG. 10 is a schematic configuration view of a geophysical data monitoring apparatus of the present invention.

The configuration of the monitoring apparatus according to an embodiment shown in FIG. 10 will be described hereinbelow.

A monitoring apparatus 10 includes a geophysical data input means 13 that inputs geophysical data of a plurality of locations via a data input device, a data processing means 14 that processes geophysical data, and an data output means 15 that outputs processing results to an output device.

Subsequently, the signal flow in the embodiment of FIG. 10 will be described.

Geophysical data 11 are input to the geophysical data input means 13 via the data input device 12 and are then input to the data processing means 14. In addition, the data is processed by the data processing means 14 and is then input to the data output means 15. In the data output means 15, the data is output to an output device, such as a CRT monitor or a Web server, in the form of for example, screen data, a Web page, or e-mail.

Figure 12:
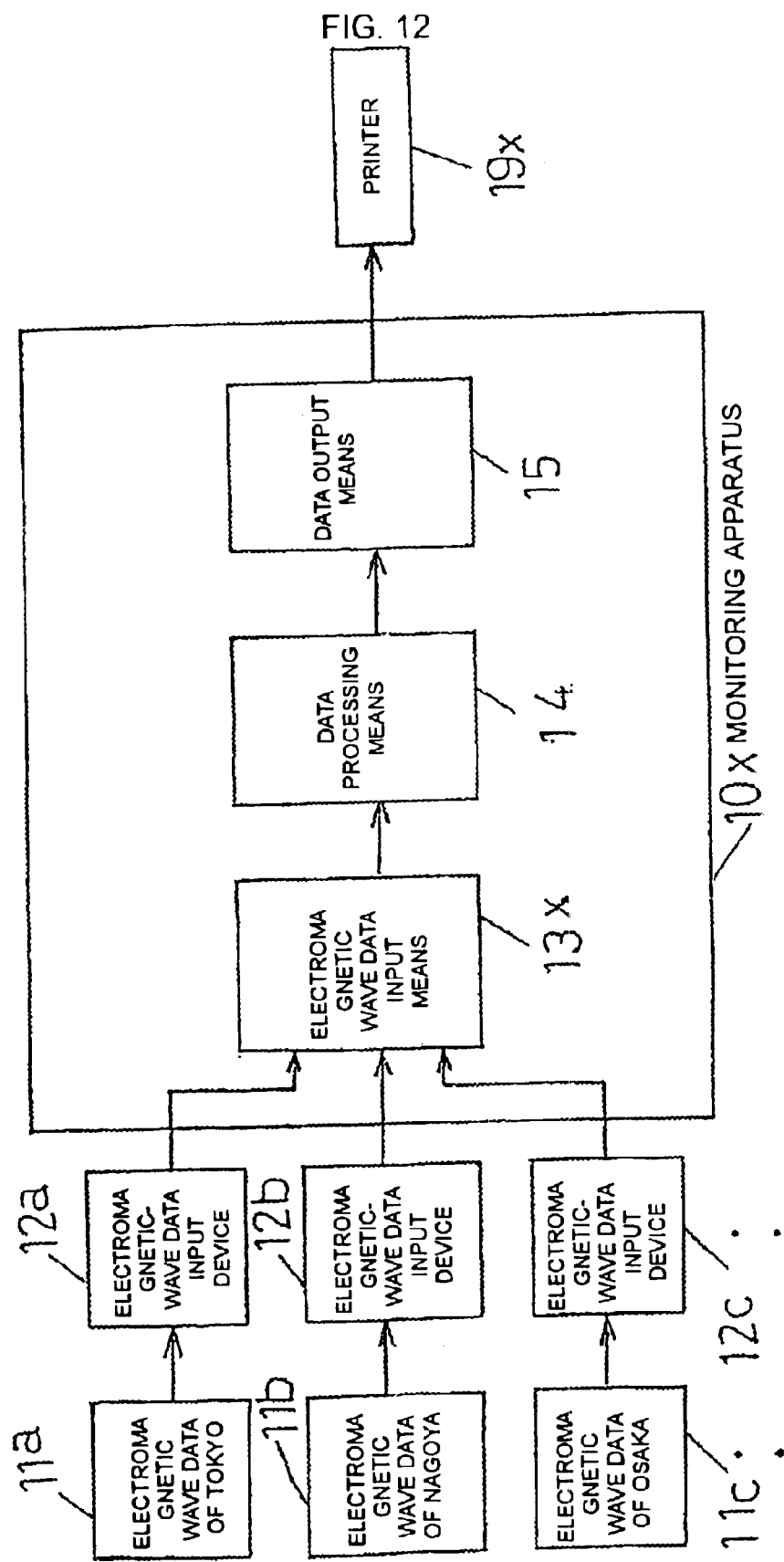
FIG. 12 is a second view corresponding to the 2nd embodiment of the present invention.

FIG. 12 shows the embodiment of FIG. 10 in more detail.

Firstly, the configuration will be described hereinbelow.

A monitoring apparatus 10x shown in FIG. 12 includes electromagnetic-wave data input means 13x that inputs electromagnetic wave data sent from, for example, Tokyo, Nagoya, and Osaka, via electromagnetic-wave data input devices 12a, 12b, and 12c; the data processing means 14; and the data output means 15 that outputs the processing result to a printer.

Hereinbelow, the signal flow will be described.

Geophysical data 11a, 11b, and 11c are input to the electromagnetic-wave data input means 13x via an electromagnetic-wave data input device and are then input to the data processing means 14. In addition, the data is processed by the data processing means 14 and is then input to the data output means 15. Finally, the data processing result is output to a printer 19x.

Figure 13:
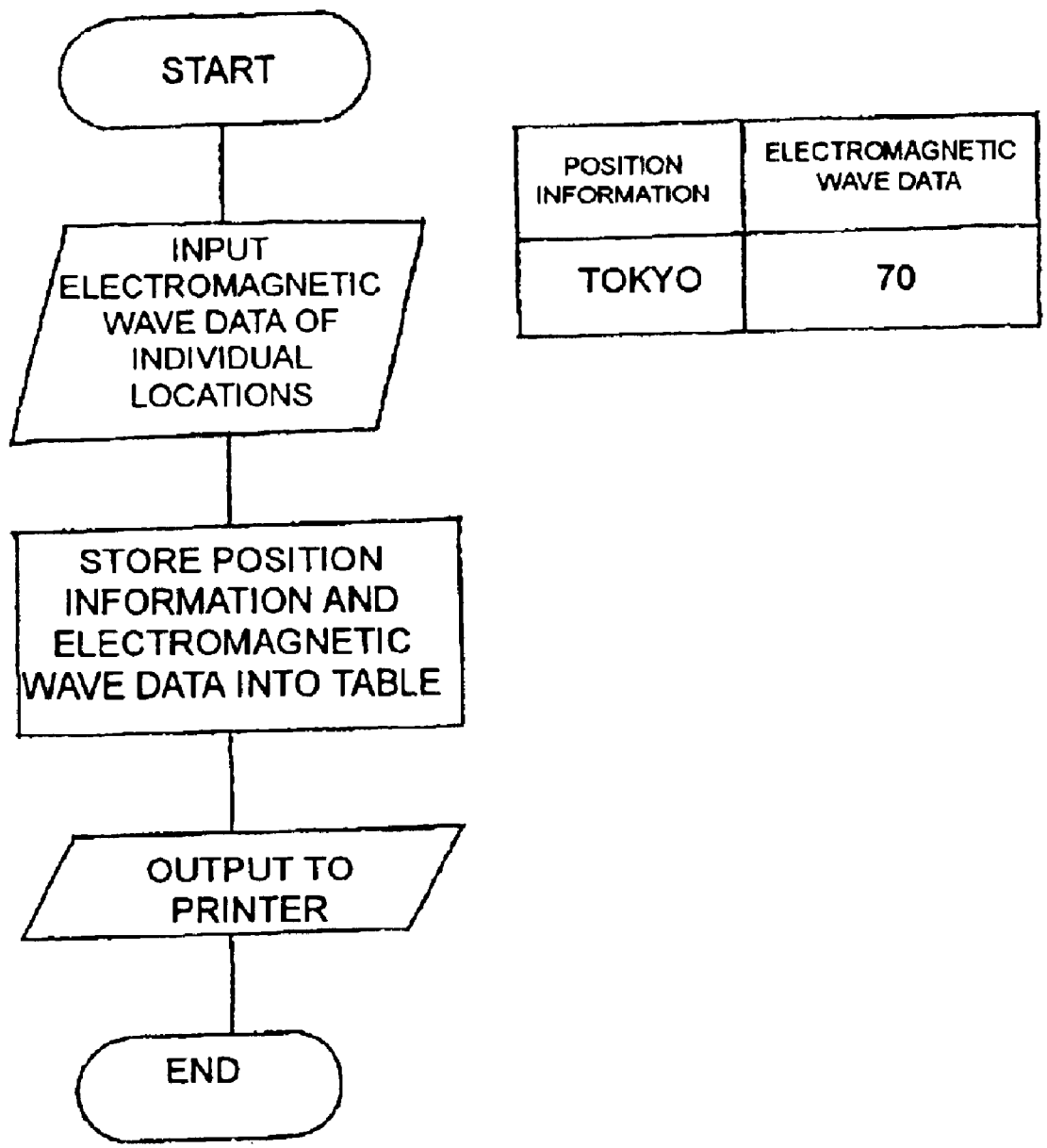
FIG. 13 is a third view corresponding to the 2nd embodiment of the present invention.

FIG. 13 is a flowchart representing the contents of processing of the monitoring apparatus 10x. Firstly, processing executes the step "Input electromagnetic wave data of individual locations". As shown in FIG. 14, example data represents "electromagnetic wave data in Tokyo=70 (counts/unit time)".

Next, processing executes the step "Store position information and the electromagnetic wave data of the individual locations into a table," and finally outputs the data to the printer.

FIG. 14 shows an example output of the embodiment shown in FIG. 10 that is executed in accordance with the flowchart of FIG. 13. The example data as the geophysical data represents "noise counts per unit time". The position information represents as Tokyo, Nagoya, Osaka, . . . Thus, the data processing means 14 correlates the geophysical data with the locations, and the data output means 15 executes the output process.

<2nd Embodiment>

FIG. 11 shows the configuration of geophysical data employed by the embodiment of the present invention. In this case, the geophysical data is shown in detail. It will be described with reference to an atmospheric ion density by way of example.

The atmospheric ion density is said to increase before an earthquake. According to the embodiment shown in FIG. 10 that is executed in accordance with the flowchart of FIG. 13, if the geophysical data represents "atmospheric ion density," the state of variations in the atmospheric ion density can be observed through the output device.

<3rd Embodiment>

Figure 15:
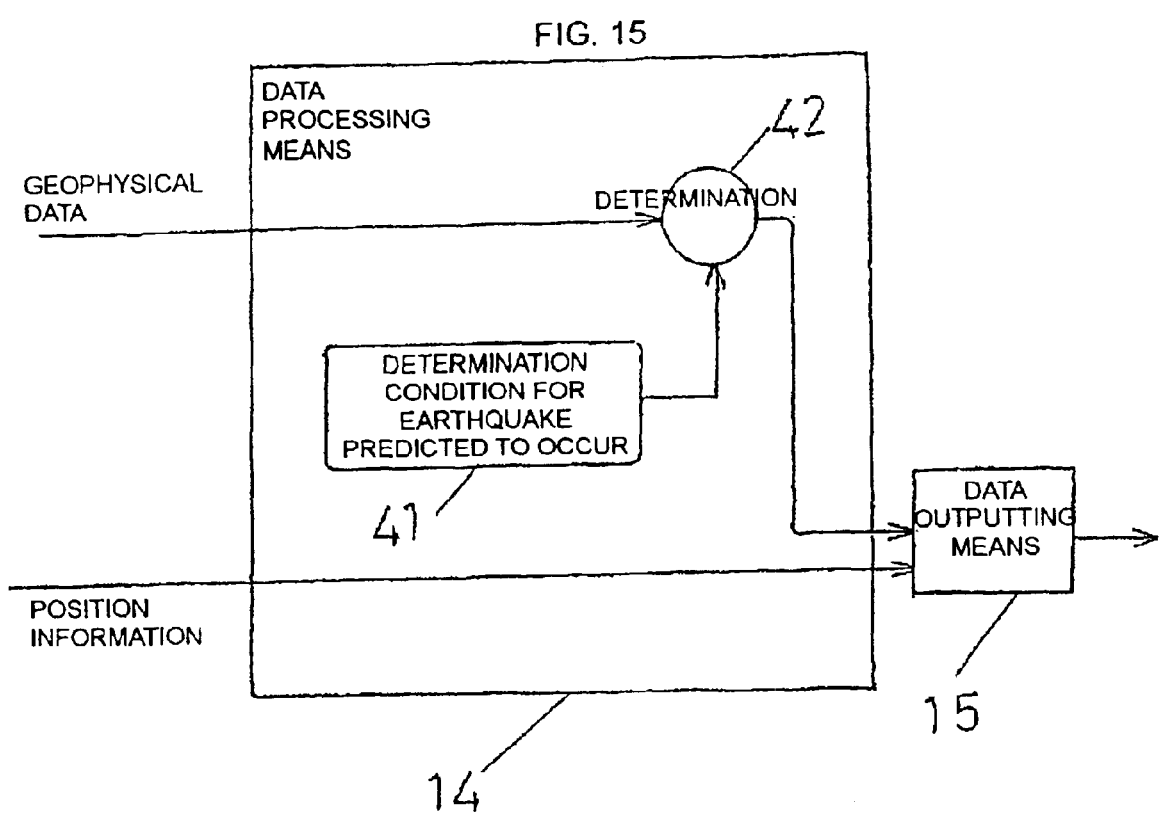
FIG. 15 is a view corresponding to a 3rd embodiment of the present invention.

FIG. 15 shows the data processing means 14 of the embodiment of FIG. 10 that is executed in accordance with the flowchart of FIG. 13. In the case of the embodiment shown in FIG. 12, the "noise counts per unit time" are displayed. In the case of the noise count, when the noise count increases, the earthquake occurrence rate is considered to be increased; and it signifies that the electromagnetic wave noise count is directly displayed even without a specific determination condition. However, geophysical data includes those of a type that cannot be used as it is for earthquake forecast without being subjected to some determination processing. In the present case, data requiring such determination processing are used as objectives. For example, before the occurrence of a great earthquake, variations in earth surface temperature have been observed. In addition, this is said to influence the atmospheric temperature and humidity over the surface layer of the earth surface.

Figure 2:
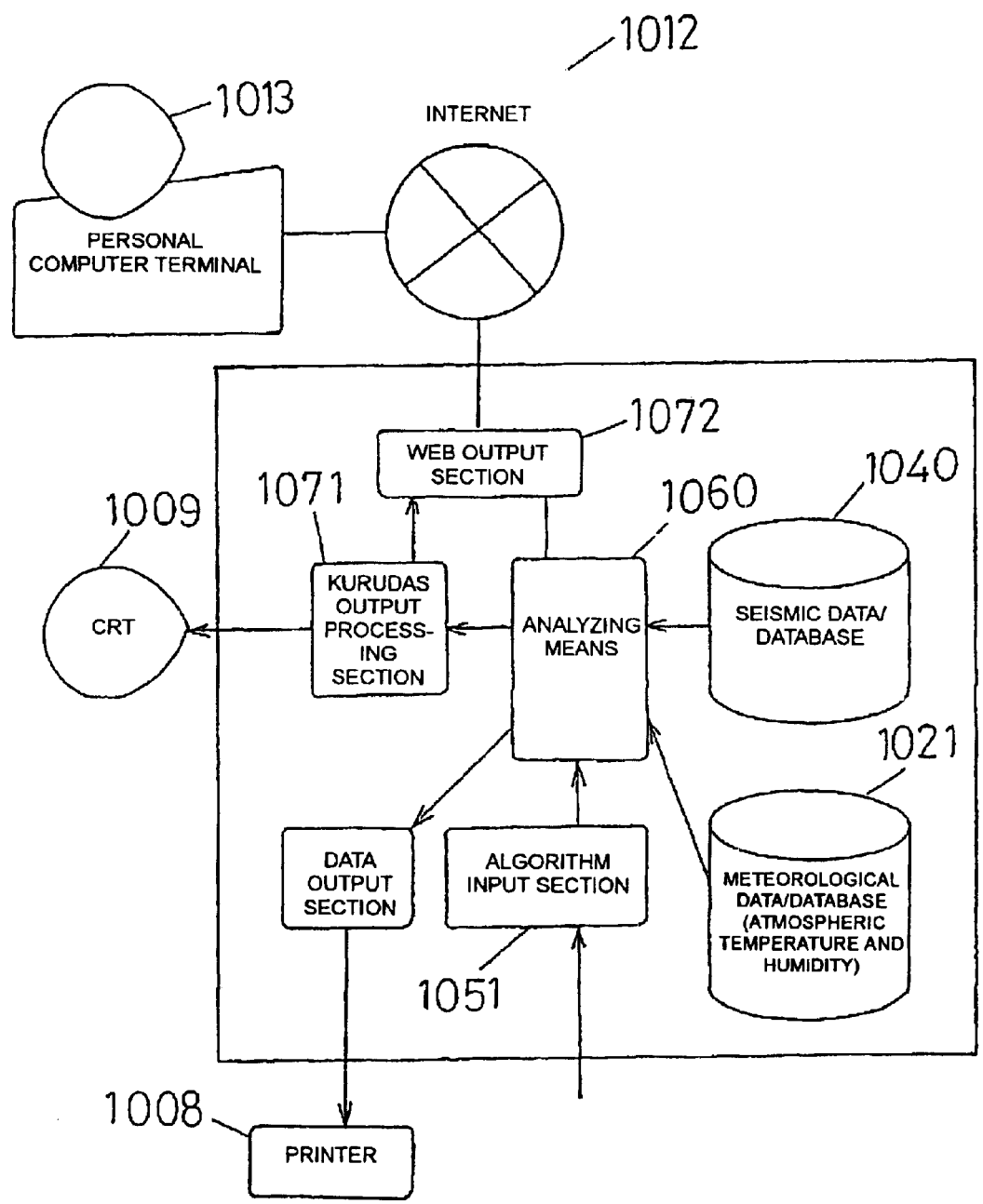
FIG. 2 is a view showing an example configuration of an analyzing apparatus according to the present invention example in the case where meteorological data is used as geophysical data.
Figure 3:
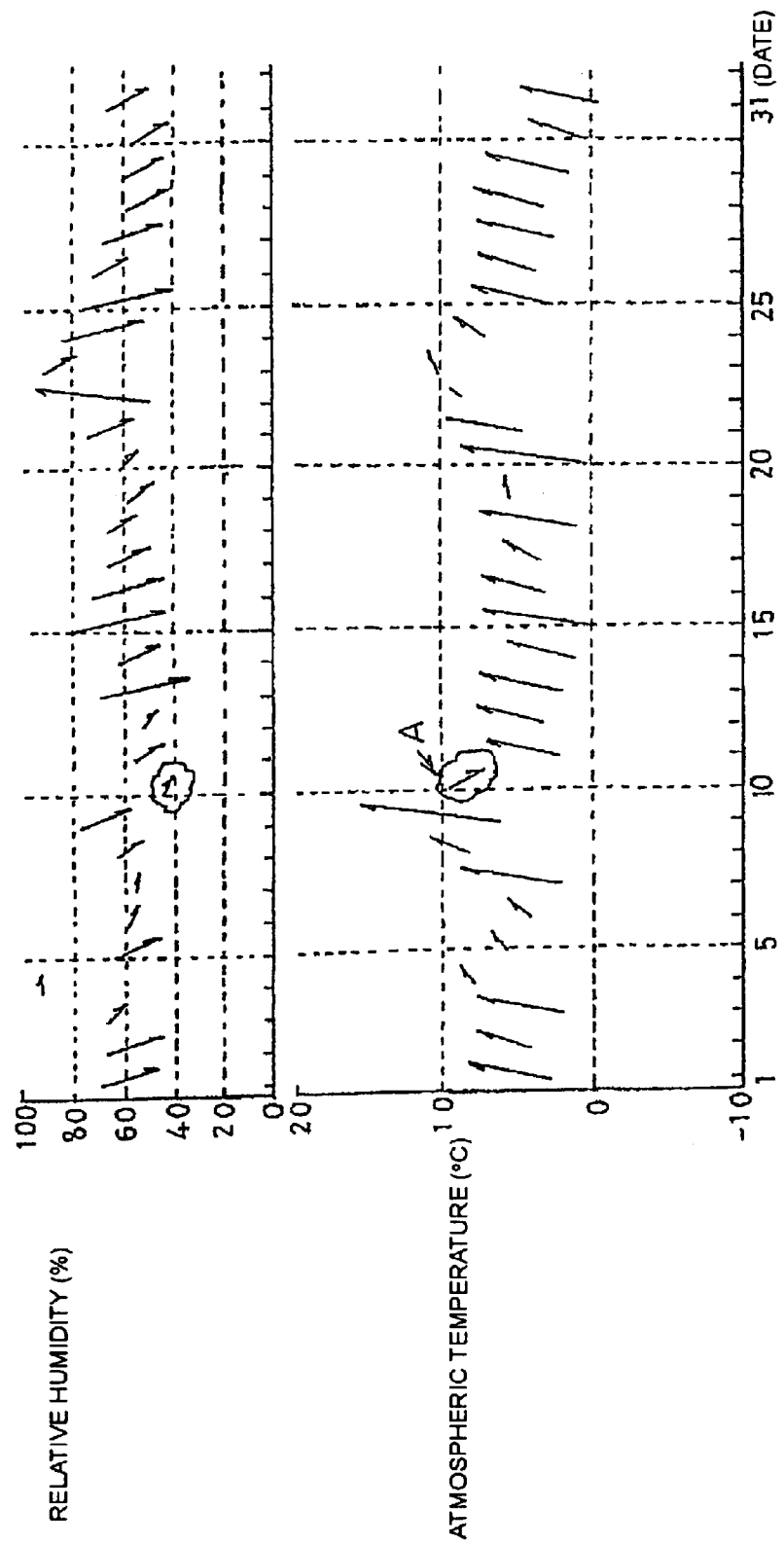
FIG. 3 is a view showing variations in the atmospheric temperature and humidity (observation site: Kobe Marine Observatory; observation date: January 1995; observation time: 01 to 14 hours) in Hanshin Great Earthquake (occurrence date/time: Jan. 17, 1995/05:46; the name of earthquake: Hyogo-ken South Earthquake; magnitude: 7.2; depth: 16 km). The view is equivalent to an earthquake forecast graph with respect to the atmospheric temperature and relative humidity. A portion circled in the field of relative humidity on 1/10 and a portion (anomalous portion) circled with the character A in the field of atmospheric temperature threat field represent a phenomenon in which the atmospheric temperature was reduced, and also the humidity was reduced seven days before 1/17 on which the earthquake occurred. The humidity was reduced lower than the circled portion in the field of relative humidity; therefore, the temperature reduction is not caused by rainfall.
Figure 5:
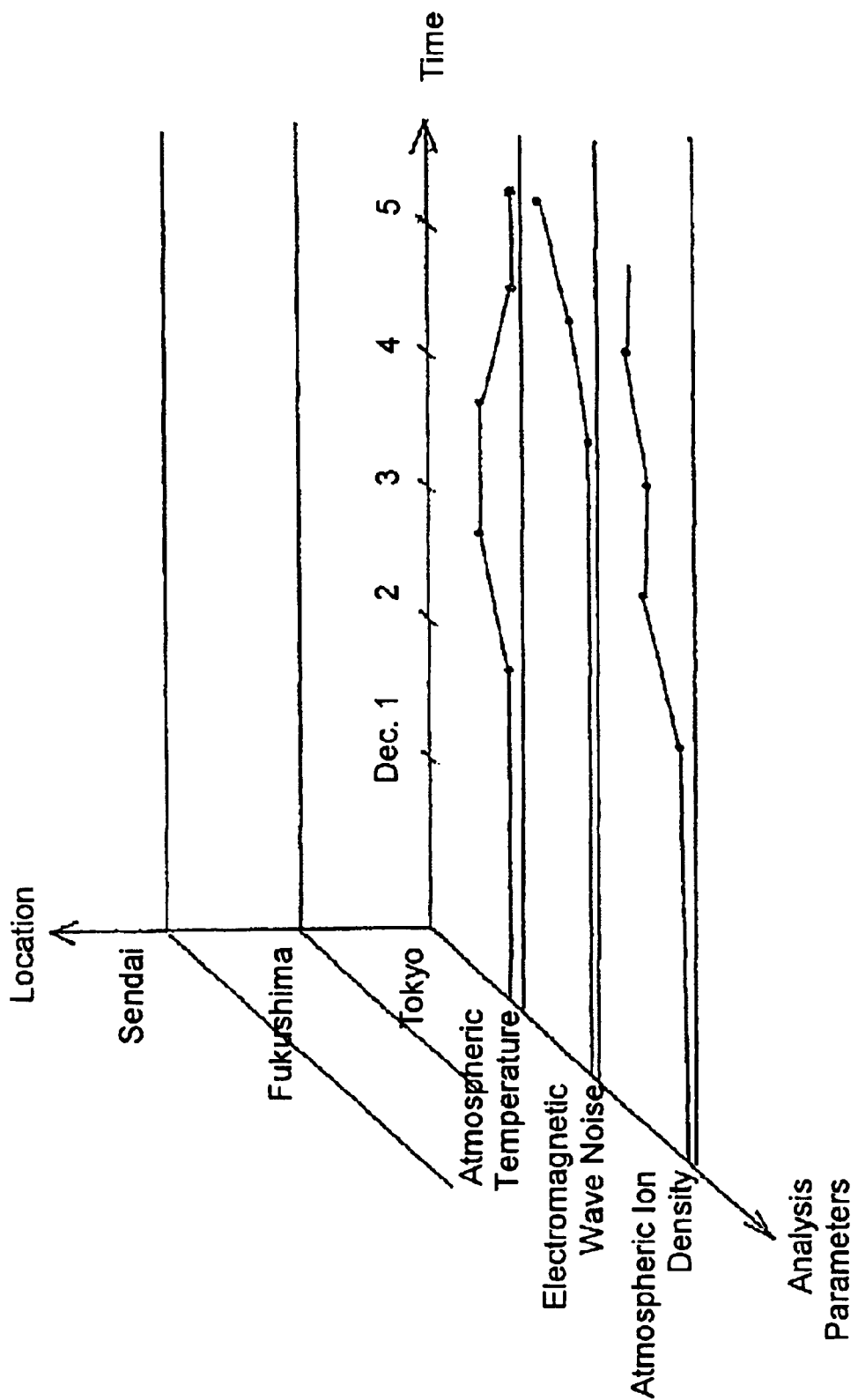
FIG. 5 is a view showing an example output as a result of analysis performed by the analysis technique of the present invention, which shows analysis locations and analysis parameters in time series.
Figure 6:
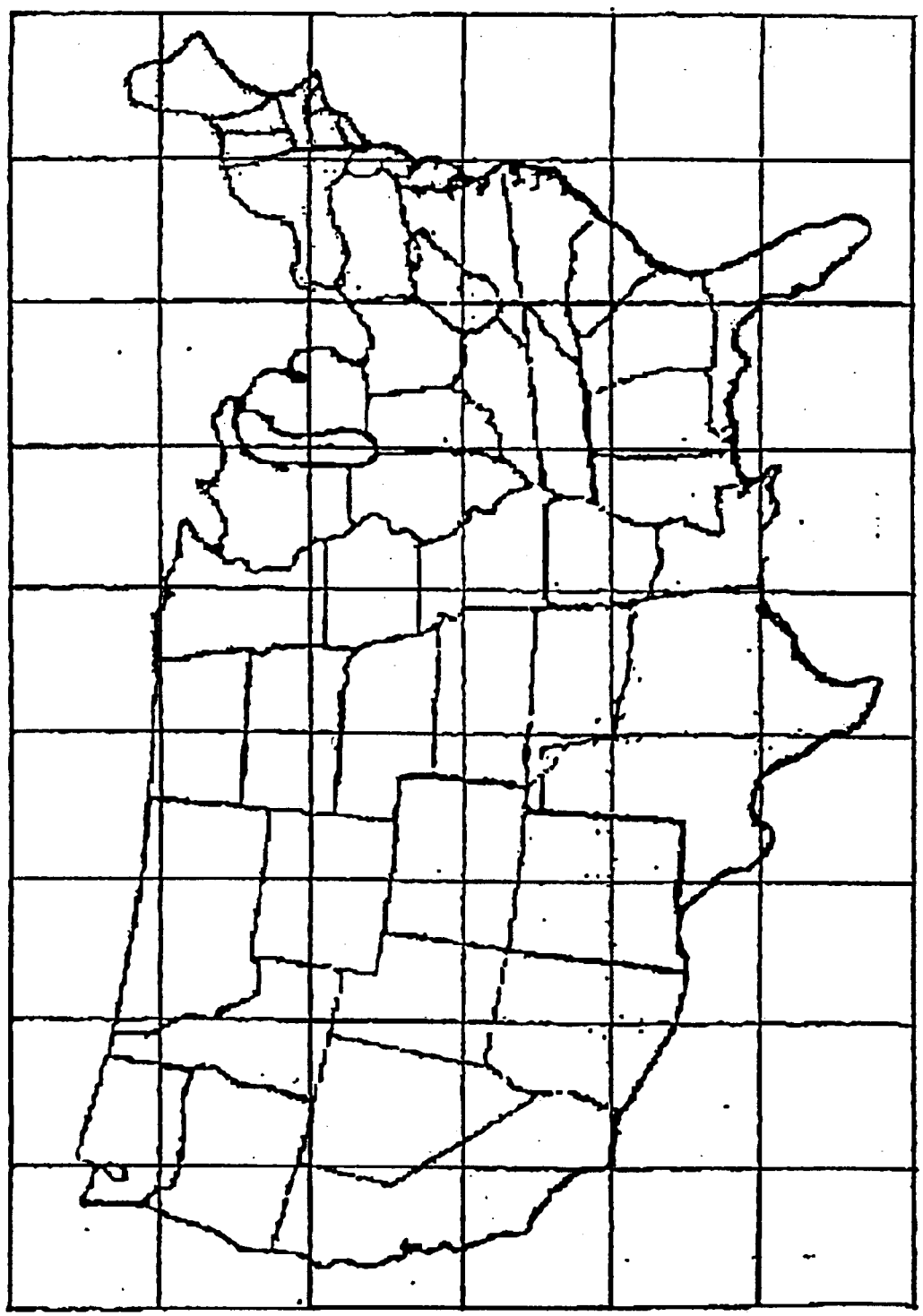
FIG. 6 is a view showing an example output as a result of analysis performed by the analysis technique of the present invention, which shows locations conforming to conditions of an analysis algorithm.
Figure 7:
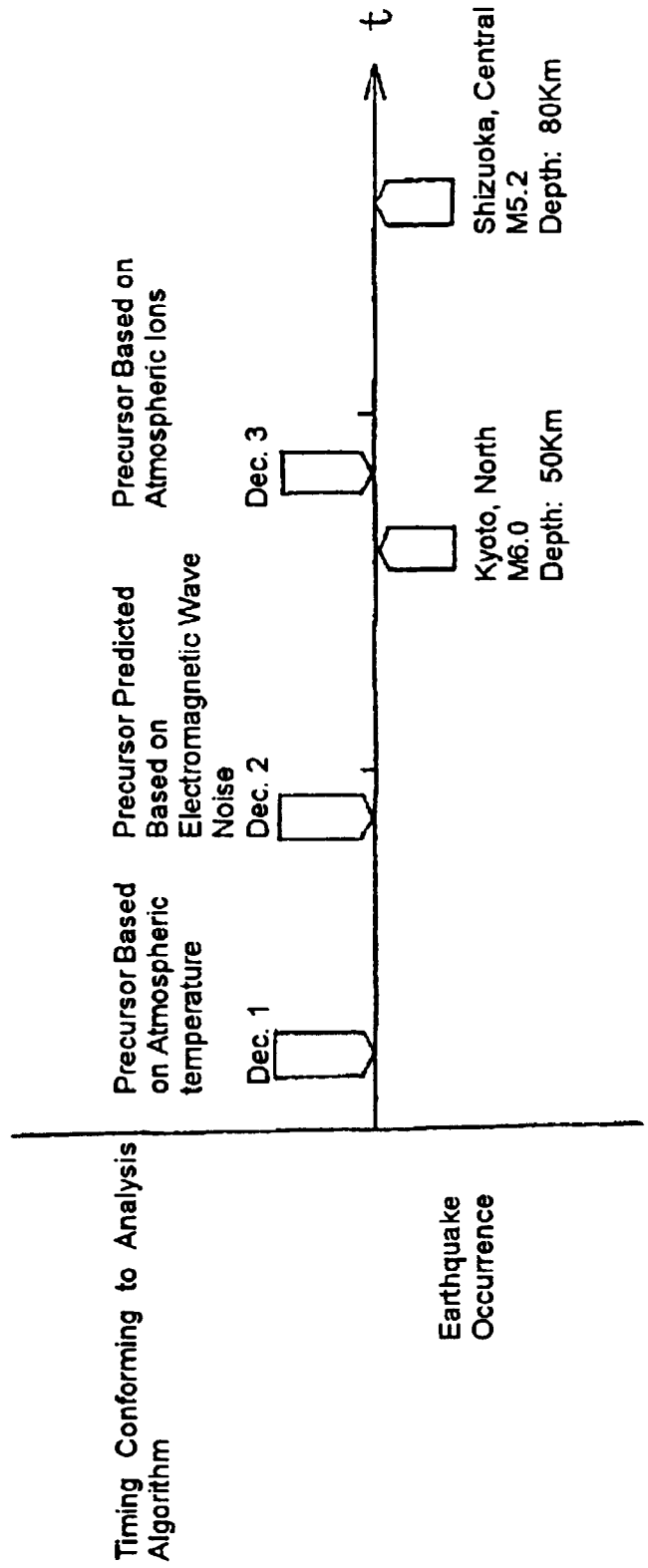
FIG. 7 is a view showing an example output as a result of analysis performed by the analysis technique of the present invention, which shows times conforming to conditions of an analysis algorithm and earthquake occurrence times in comparison.
Figure 9:
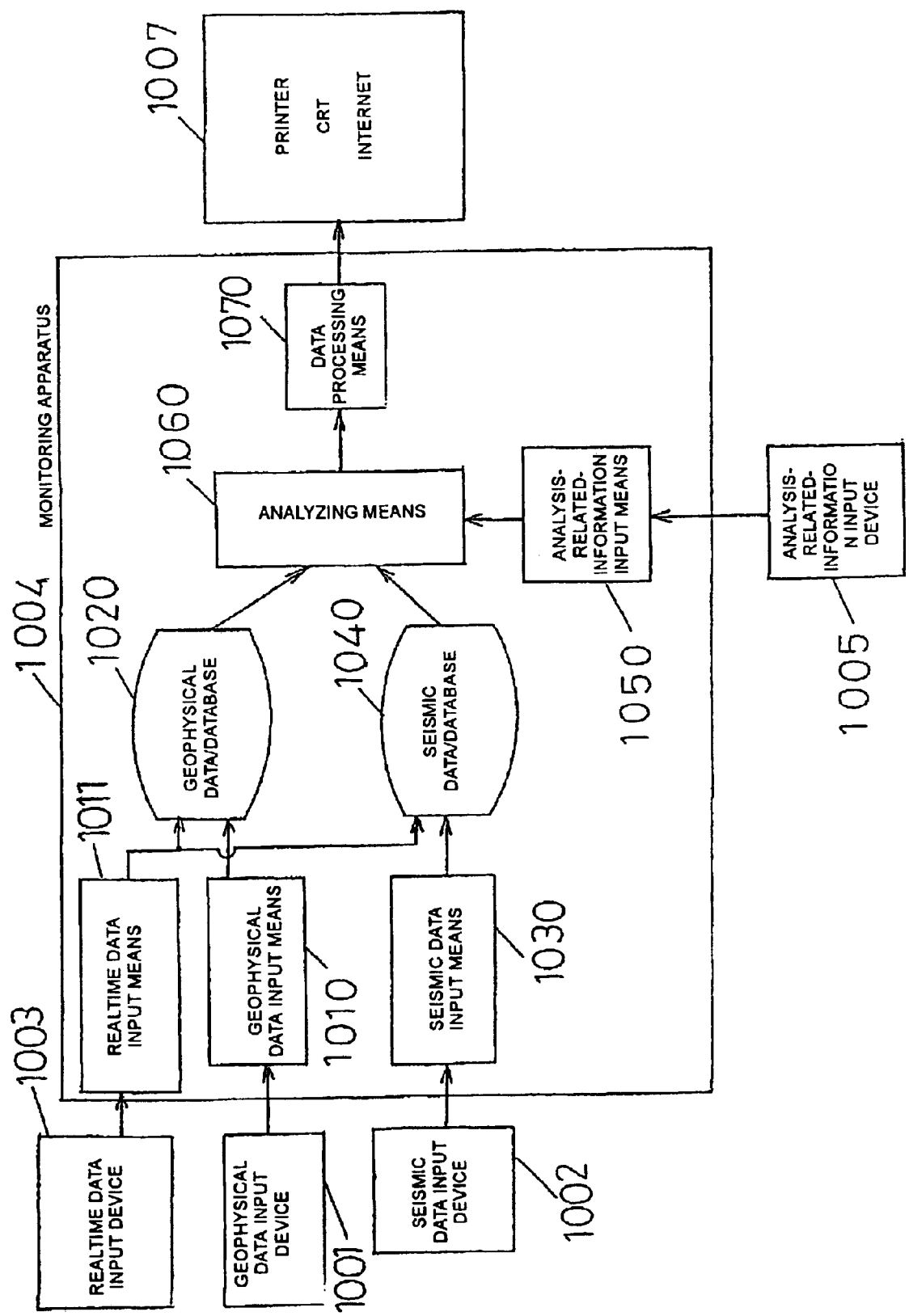
FIG. 9 is a view showing an example configuration of another analyzing apparatus according to the present invention.

When the atmospheric temperature and humidity have entered a variation pattern, there exists the condition "earthquake would occur". This is the algorithm described in the embodiment shown in FIGS. 2 and 3 (which hereinbelow will simply be referred to as an "algorithm A").

The condition described above is set for a "determination condition for an earthquake forecasted to occur" in FIG. 15. This enables the data of a pre-earthquake precursory phenomenon to be used as forecast data, similarly to the electromagnetic wave noise count.

Figure 16:
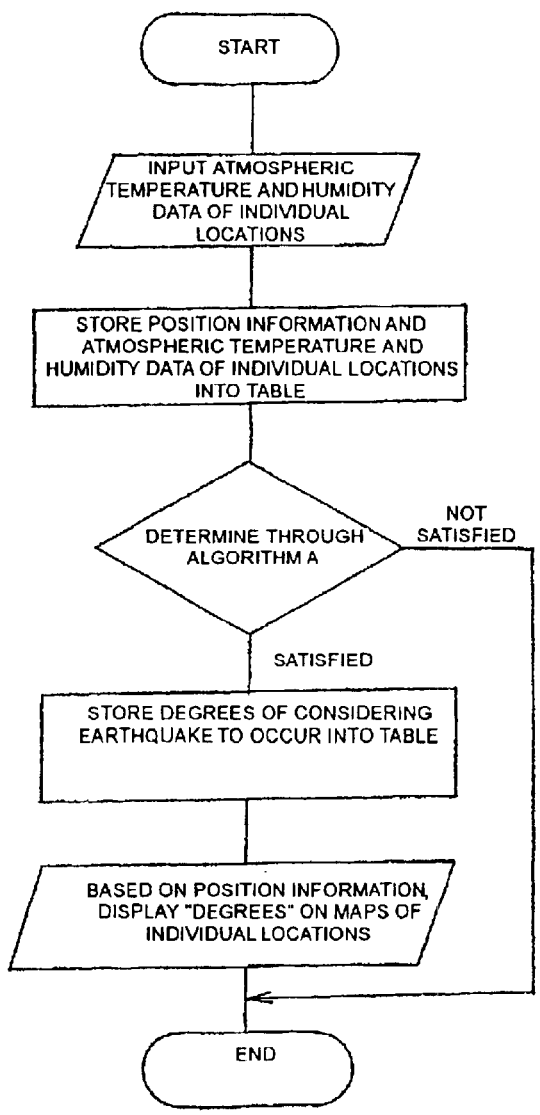
FIG. 16 is a second view corresponding to the 3rd embodiment of the present invention.

FIG. 16 shows a flowchart of data processing executed in the data processing means 14.

The basic flow is similar to that of FIG. 13. The concept of determination is added thereto, however.

At the outset, processing executes the step "Input atmospheric temperature and humidity data of individual locations". As shown in the figure, example data represents "atmospheric temperature and humidity data at 01 o'clock and 14 o'clock on December 1 in Tokyo".

Next, processing executes the step "Store position information and atmospheric temperature and humidity data of individual locations into a table". In addition, processing executes determination by using the algorithm A; and if the data conform to the algorithm A, processing executes the step "Store degrees of considering an earthquake to occur into the table". The degrees in this case can be considered to be set in various ways. For example, the degree is increased in proportion to the increase in atmospheric temperature difference, or the degree is increased in proportion to the increase in humidity variations. Finally, processing executes the step "Display the "degrees" on maps of the individual locations in accordance with the position information". If the algorithm A is not satisfied, no specific processing is executed.

<4th Embodiment>

Figure 17:
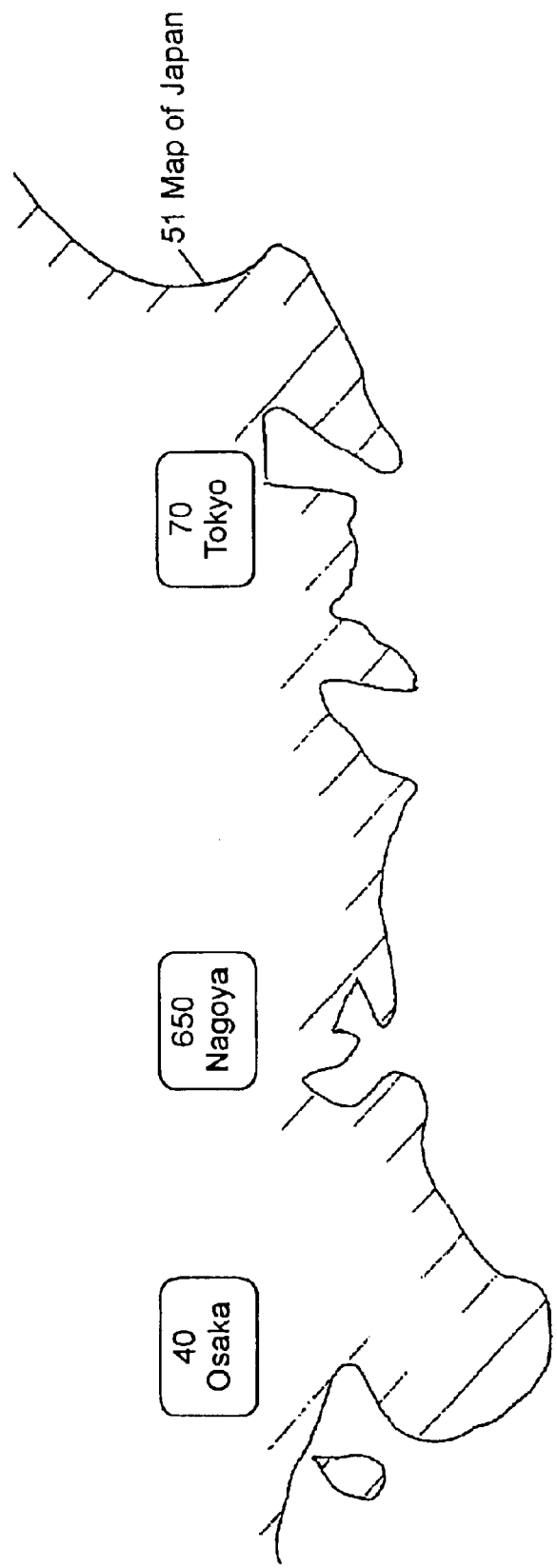
FIG. 17 is a view corresponding to a 4th embodiment of the present invention.

FIG. 17 shows a geophysical data monitoring apparatus according to the present invention. The embodiment shown in FIG. 17 represents the nucleus of the present invention.

Any one of the embodiments of the geophysical data monitoring apparatus according to the present invention has the geophysical data and the position information.

The 4th embodiment displays the information on a two-dimensional map, of which the contents are visually easy to understand.

In the present embodiment, Tokyo, Nagoya, and Osaka that are geographically remote from each other are displayed. However, finely setting observation spots enables display to be implemented in the form of a so-called matrix (mesh) as in the case of AMeDAS. In addition, although numerals are used for the information identification on the map, an alternative method may be used for the identification, such as the color depths and tones (for example, from yellow and orange to red), or the sizes of a graphical figure such as a circle mark.

Figure 18:
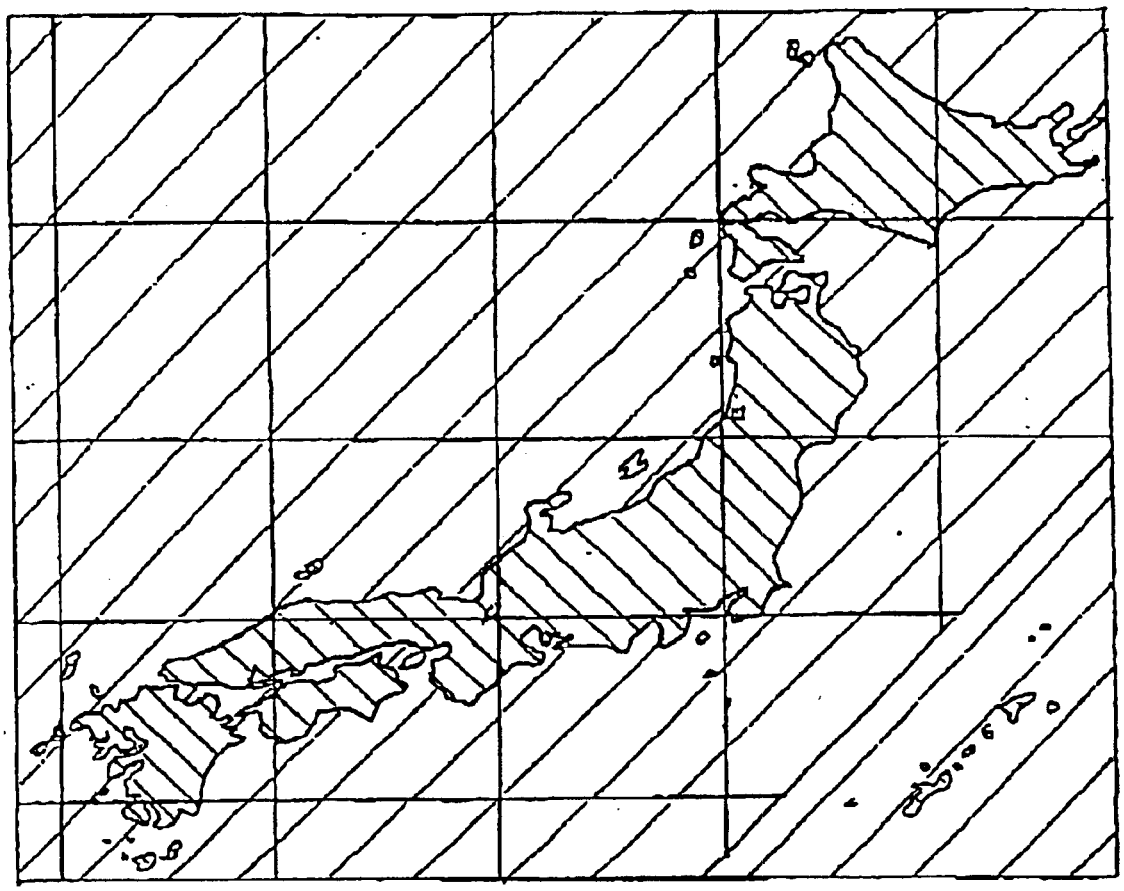
FIG. 18 is a second view corresponding to the 4th embodiment of the present invention.

FIG. 18 shows an embodiment enhanced from the embodiment corresponding to FIG. 17 to cover all areas of Japan.

In comparison to AMeDAS that displays rainfall locations, there is a system called "KURUDAS" named to imply the meaning of the Japanese verb "kuru (or, oncoming)". In the example shown, although the mesh is coarse, it can easily be set to be fine by finely arranging observation spots.

Generally, it is considered difficult to obtain the data of earthquake precursory phenomena. However, according to the present embodiment, the data can easily be obtained. Further, the present embodiment is an advantageous in that the research on earthquake precursors considered difficult to be secured can be expected to rapidly advance.

<5th Embodiment>

Figure 19:
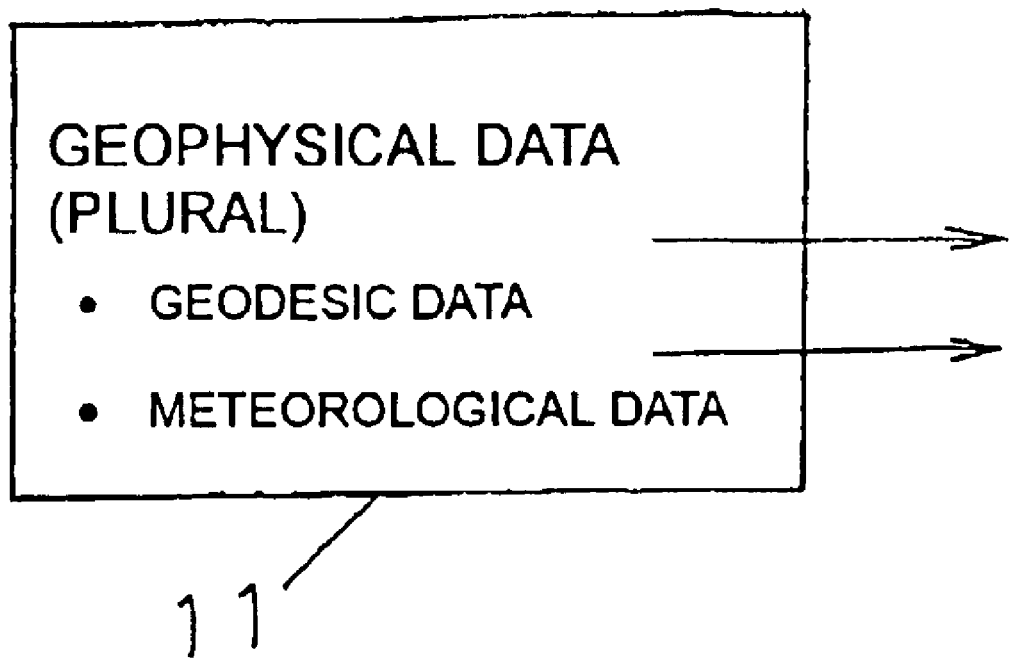
FIG. 19 is a view corresponding to a 5th embodiment of the present invention.

FIG. 19 shows another embodiment of a geophysical data monitoring apparatus according to the present invention. While the 4th embodiment handles data of a single type, the present embodiment handles data of multiple types.

The present embodiment is advantageous in that, in comparison to the apparatus handling data of a single type, the forecast can be implemented with higher reliability.

<6th Embodiment>

Figure 20:
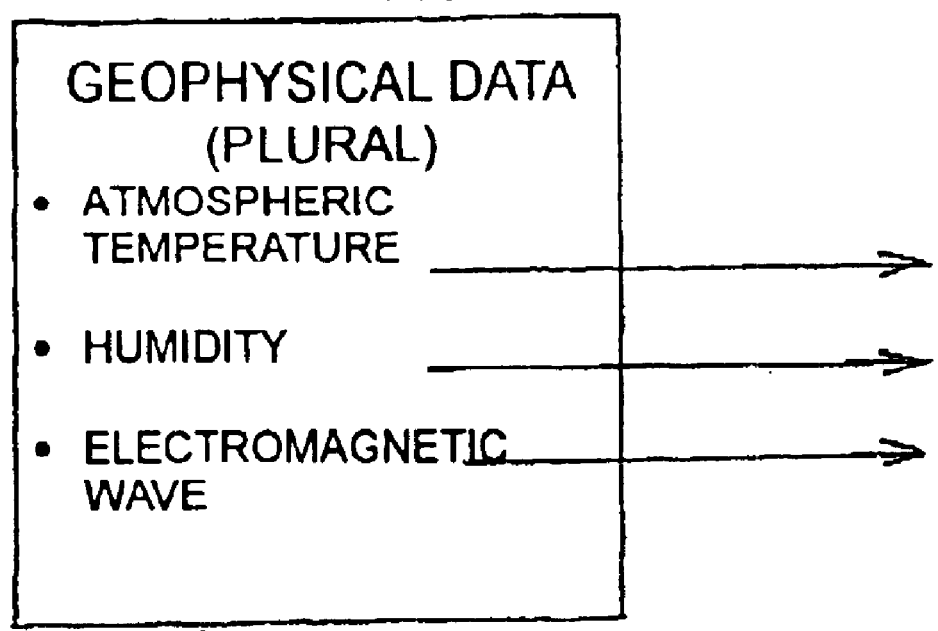
FIG. 20 is a view corresponding to a 6th embodiment of the present invention.

FIG. 20 shows still another embodiment of a geophysical data monitoring apparatus according to the present invention. The captioned embodiment handles atmospheric temperature data, humidity data, and electromagnetic wave data.

The present embodiment is advantageous in that since it handles data of the two types, i.e., meteorological data and electromagnetic data, it has an advantage in that forecast can be implemented with higher reliability than in the case of data of a single type.

<7th Embodiment>

FIG. 21 shows another embodiment of a geophysical data monitoring apparatus according to the present invention. The captioned embodiment handles data of which time span is short and long before the occurrence of respective earthquakes after the appearance of earthquake precursors.

The present embodiment is advantageous in that since a time difference occurs, a precursor can be early secured and in that since the data of two types are handled, forecast can be implemented with higher reliability than in the case of data of a single type.

<8th Embodiment>

Figure 22:
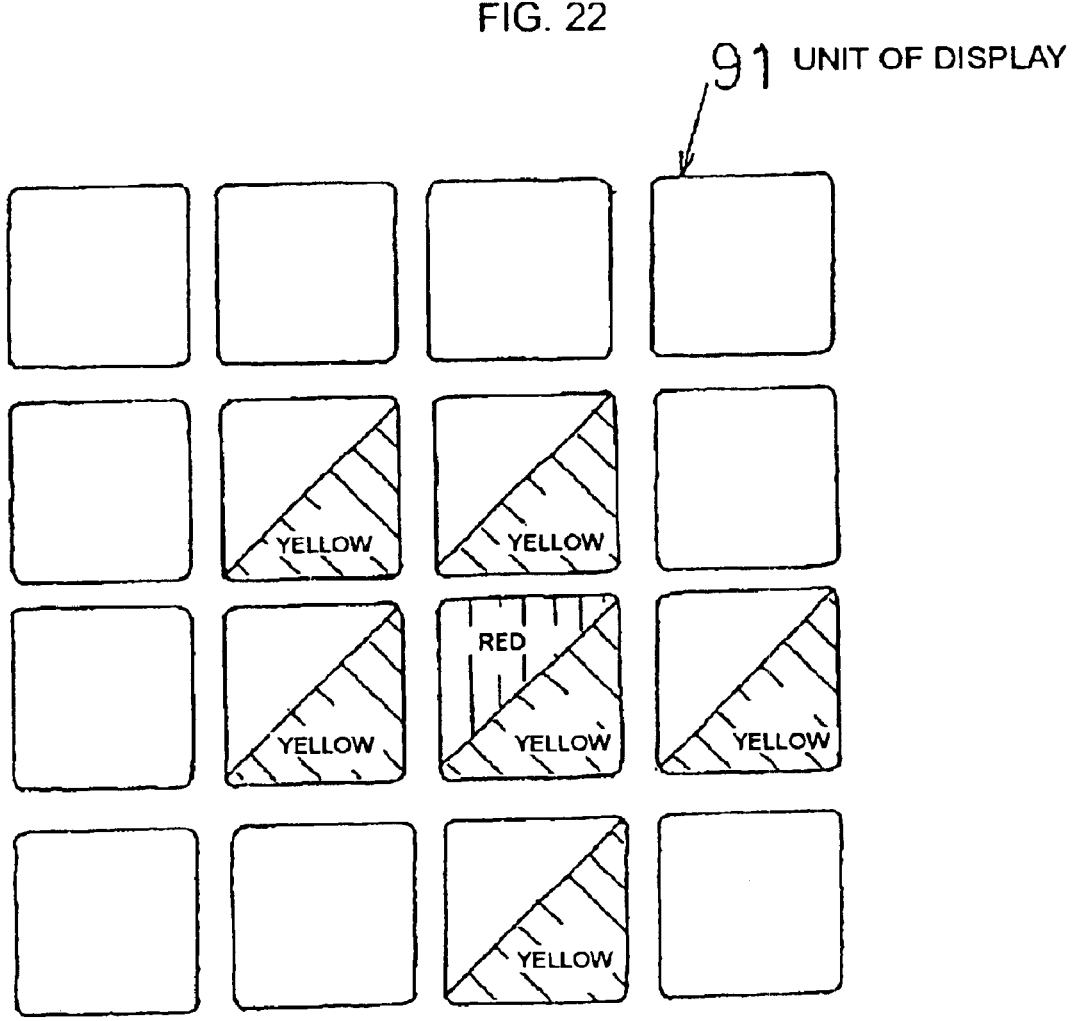
FIG. 22 is a view corresponding to a 8th embodiment of the present invention.

FIG. 22 shows another embodiment of a geophysical data monitoring apparatus according to the present invention. The figure shows KURUDAS's represented in the form of a matrix, in which elements each representing a long time span before the occurrence of an earthquake are represented in yellow and elements each representing a longer time span before the occurrence of an earthquake are shown in red.

The present embodiment is advantageous in, for example, that an earthquake forecast can be displayed in an early stage and that display thereof can be implemented with higher reliability than in the case of data of a single type.

<9th Embodiment>

Figure 23:
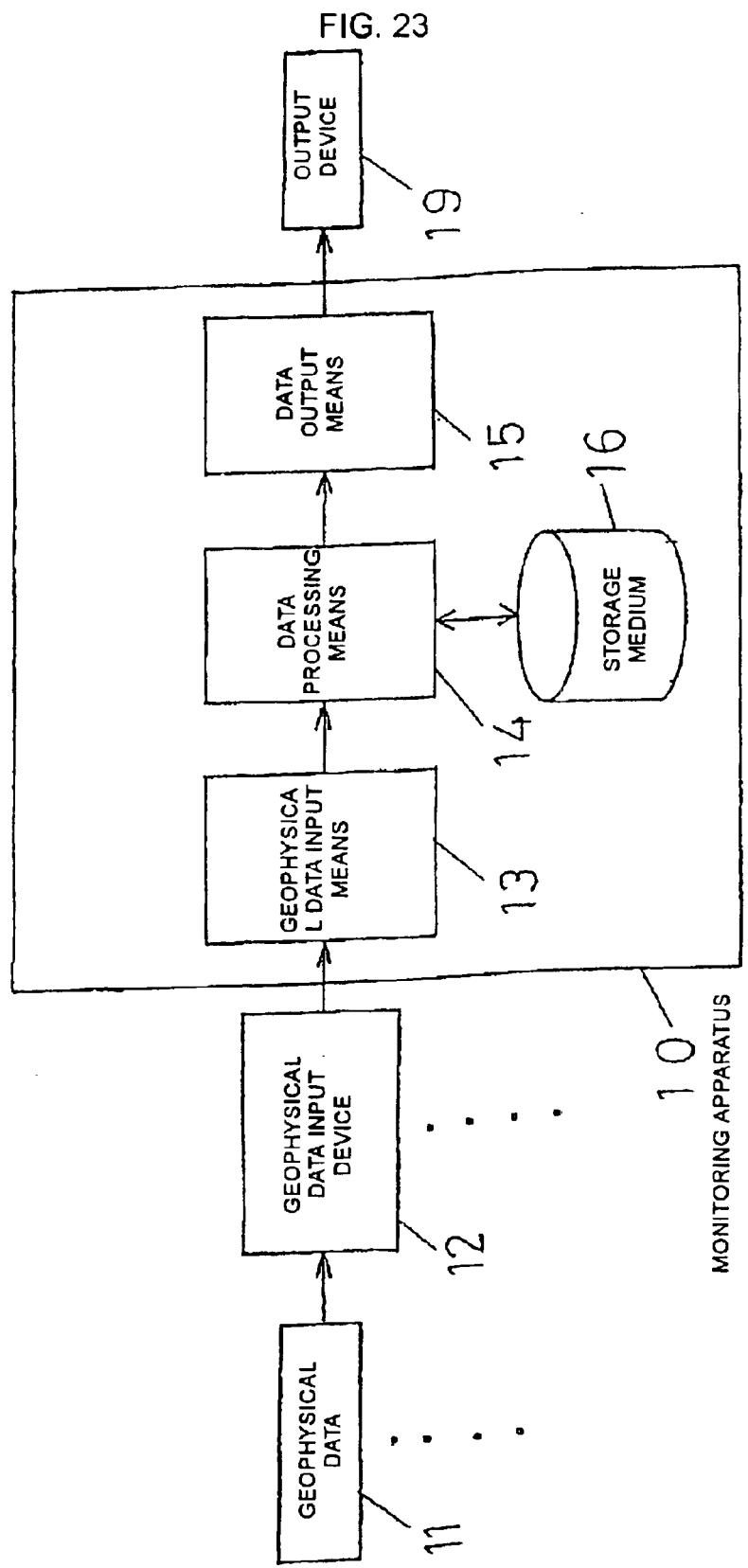
FIG. 23 is a view corresponding to a 9th embodiment of the present invention.

FIG. 23 shows another embodiment of a geophysical data monitoring apparatus according to the present invention. The present embodiment is configured by adding a storage medium that is used to store, for example, earthquake history data and data representing determination results. The storage medium refers to a physically existing substance that manages memory. Specifically, the storage medium refers to, for example, a magnetic disk device, an optical disk device, a magneto-optical disk device, a semiconductor storage device, or a network storage device existing over the Internet. In addition, the storage mediums referred to herein include, for example, a main storage device used extending a main storage area for storage, and an external storage device existing in a remote place.

The present embodiment has an advantage that enables computations of probabilities in earthquake forecast in accordance with a large amount of past data.

<10th Embodiment>

Figure 24:
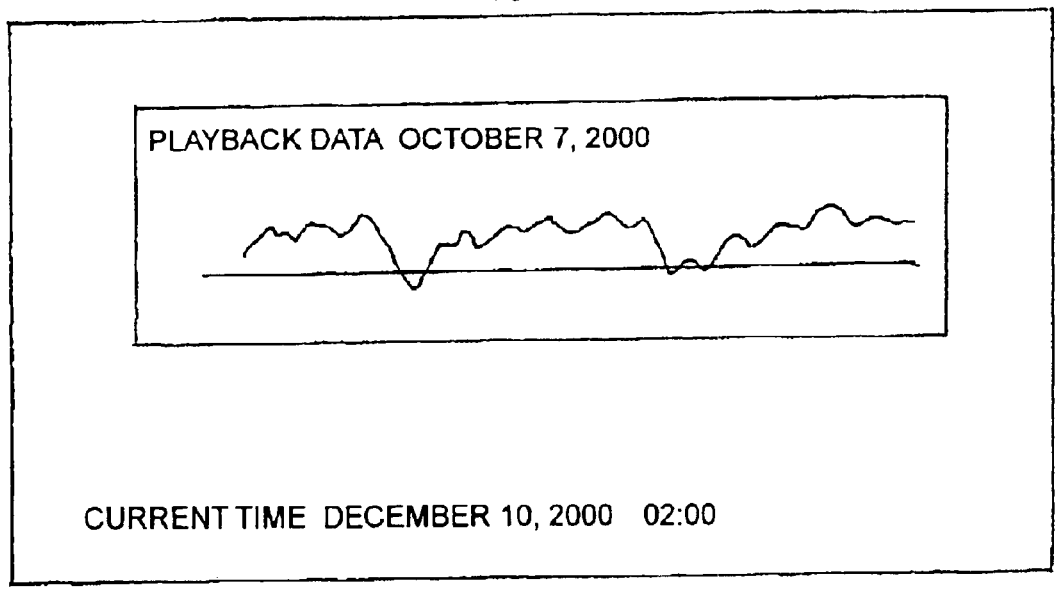
FIG. 24 is a view corresponding to a 10th embodiment of the present invention.

FIG. 24 shows another embodiment of a geophysical data monitoring apparatus according to the present invention. The present embodiment is arranged to implement graphical display of data in a point of past time.

The present embodiment has an advantage in that a large volume of past data can be used for earthquake-forecast computations.

<11th Embodiment>

Figure 25:
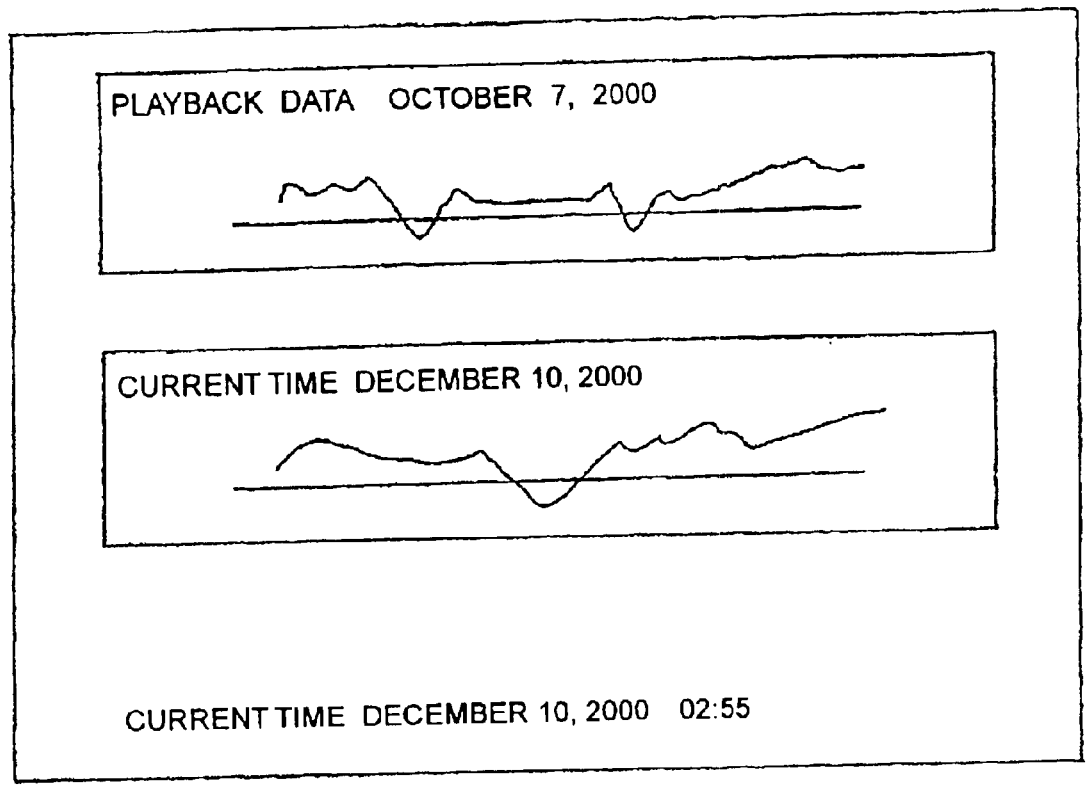
FIG. 25 is a view corresponding to a 11th embodiment of the present invention.

FIG. 25 shows another embodiment of a geophysical data monitoring apparatus according to the present invention. The present embodiment is arranged to implement display of both a graph of earthquake forecast data in a point of past time and a graph of earthquake forecast data in a point of current time on a same screen.

The present embodiment has an advantage in that earthquake forecast can be implemented with reference to a past graph.

Although the figure shows only the example displaying only one past graph, a plurality of past graphs can of course be displayed.

<12th Embodiment>

Figure 26:
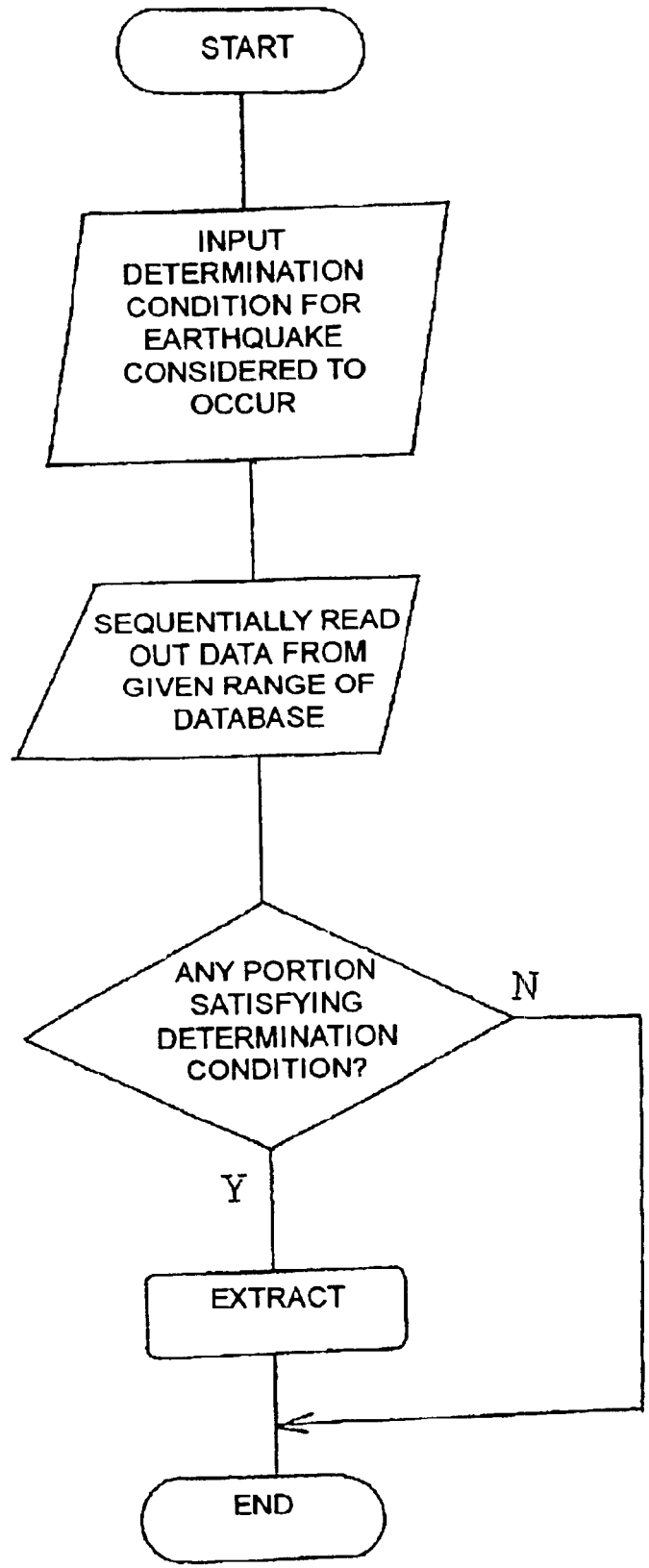
FIG. 26 is a view corresponding to a 12th embodiment of the present invention.

FIG. 26 shows a flowchart of processing performed by the embodiment of FIG. 25. The present embodiment is arranged such that, in the monitoring apparatus to which the storage medium is added, a determination condition for an earthquake forecasted to occur is given, geophysical data in a given range of a database are sequentially read out, and a portion of data satisfying the determination condition is extracted. In this case, a method is adapted that reads out a condition-satisfying data portion by using a software program. However, the method may be arranged to extract the condition-satisfying data portion by using, for example, a spreadsheet software program.

The embodiment thus arranged enables a data variation in the case of the occurrence of an earthquake to be retrieved without viewing a graph at each event. In addition, the embodiment is advantageous in that an objective data portion can be specified from a large volume of information.

<13th Embodiment>

Figure 27:
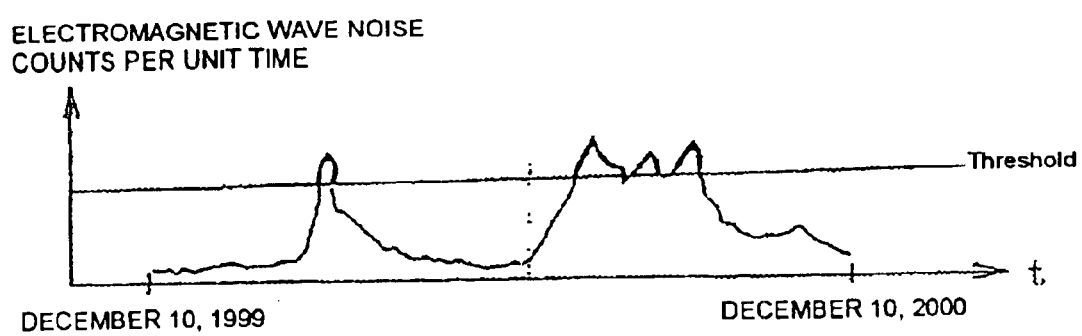
FIG. 27 is a view corresponding to a 13th embodiment of the present invention.

FIG. 27 shows another embodiment of a geophysical data monitoring apparatus of the present invention. The present embodiment is arranged such that, in the monitoring apparatus to which the storage medium is added, a determination condition for an earthquake forecasted to occur is given, a portion of data satisfying the determination condition is extracted, and display is implemented distinguishing the determination-condition satisfying data portion from a determination-condition unsatisfying data portion.

In the present embodiment, electromagnetic-wave noise data accumulated in the past one year are schematically shown by way of example. The vertical axis represents electromagnetic-wave noise counts (per unit time), and portions exceeding a given threshold are shown by thick lines as determination-condition satisfying data portions.

In addition, an arrangement can be arranged such that, for atmospheric temperature and humidity data, a graph is displayed in "blue" in a normal mode time, and a graph is displayed in "red" when the data is in an anomaly variation pattern.

According to the embodiments, a data variation in the case of the occurrence of an earthquake can be visually found and retrieved while viewing a fine (continuing in time series) long-term graph. In addition, the embodiment is advantageous in that an objective portion of the condition can be efficiently specified from a large volume of information.

<14th Embodiment>

Figure 28:
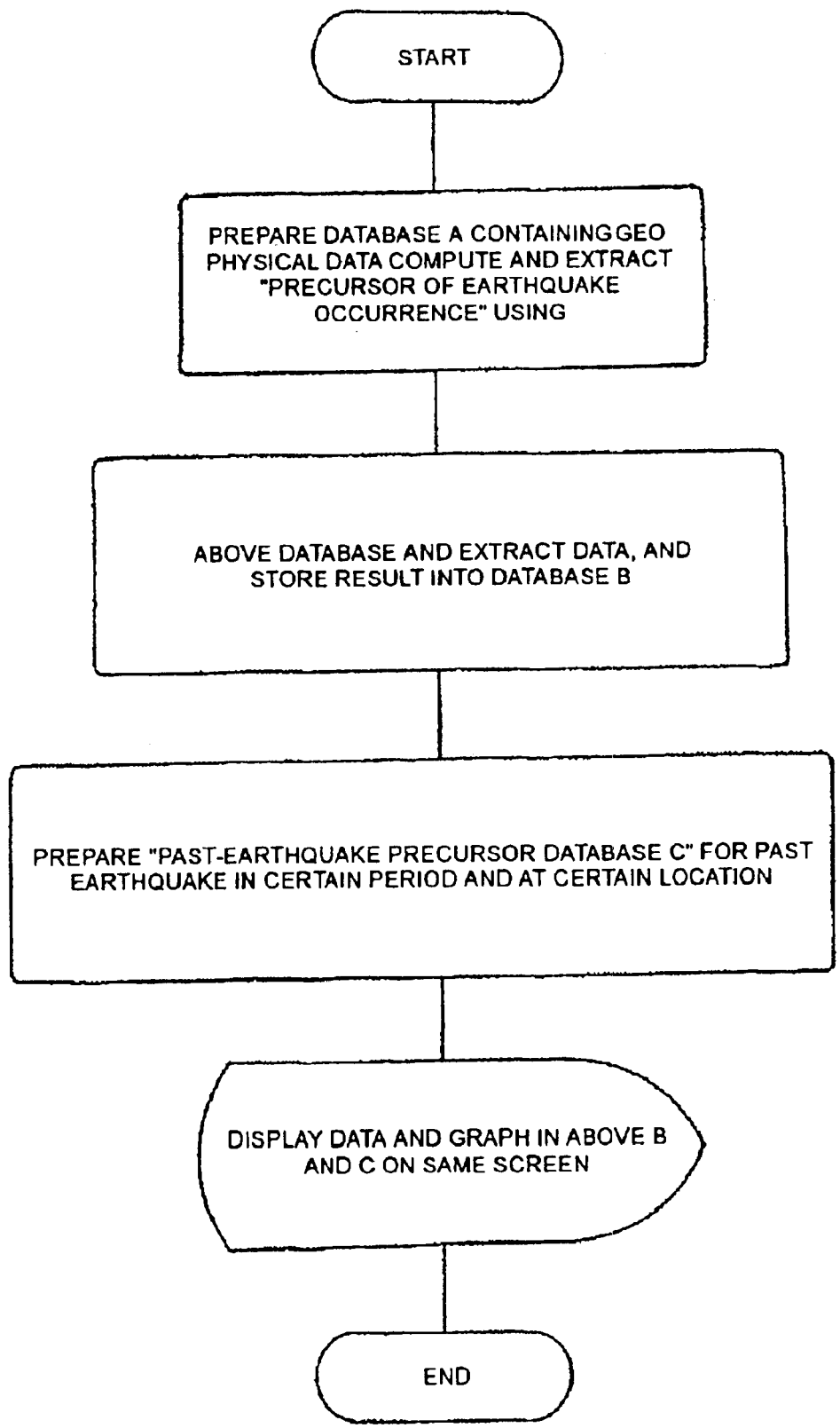
FIG. 28 is a view corresponding to a 14th embodiment of the present invention.

FIG. 28 shows a monitoring method in the embodiment shown in FIG. 17. This embodiment is an earthquake forecast method that includes a step of preparing a database A that stores geophysical data; a step of computing and extracting a determination condition forecasted to be a precursor in the case of the occurrence of an earthquake with respect to the database A, and storing the extracted result into a database B; a step of preparing a past-earthquake precursor database C for data of past earthquakes occurred in a predetermined period and in a predetermine location; and a step of displaying both data or a graph thereof satisfying the determinations condition and data or a graph of the past-earthquake precursor database on a same screen.

The four steps described above will be sequentially described hereunder.

The database A for storing geophysical data refers to a substance as the storage medium 16 described in the 9th embodiment.

A determination condition forecasted to be a precursor in the case of the occurrence of an earthquake is computed, and a portion where the precursor has occurred is extracted. Then, the extracted result is stored into the database B. The database B contains data stored in a period from a point of time when observation has commenced to a point of recent past time.

On the other hand, precursors of past earthquakes are similarly extracted in accordance with time and locations of earthquakes occurred in the past. The extracted data is stored in the past-earthquake precursor database C.

Finally, data or graphs of the database B and the database C are displayed on a same screen.

According to the present embodiment, a precursor of an earthquake (corresponding to the database C) that might have actually occurred can easily be compared with past precursors (contained in the database B), thereby enabling, for example, a new discovery to be led out. In addition, if data is compared with recent past data (contained in the database B) instead of the past precursors, the result can be used for short-term forecast.

<15th Embodiment>

Figure 29:
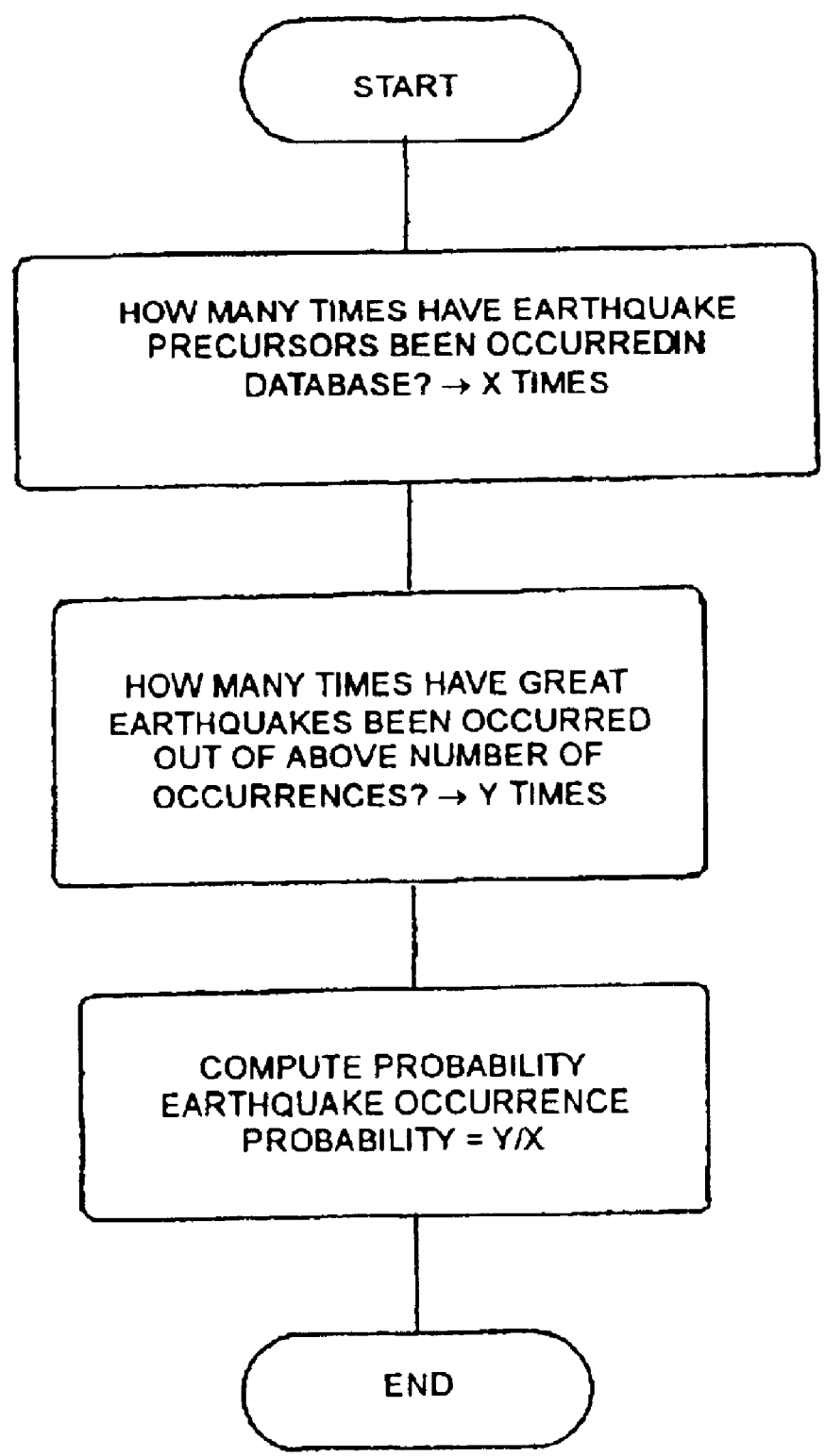
FIG. 29 is a view corresponding to a 15th embodiment of the present invention.

FIG. 29 shows steps to be processed by a geophysical data monitoring apparatus of the present invention. The present embodiment provides a geophysical data monitoring apparatus characterized in that computation is performed to obtain the probability of whether an earthquake occurs at a specified location after the appearance of a precursor of an earthquake forecasted to occur at the specified location.

Generally, what is concerned about earthquake forecast is the level of the probability obtained in the forecast. Conventionally, despite the fact that short-term probability forecast has been desired, it is not yet realized. However, the present embodiment solves the problem.

In principle, use of the embodiment as shown in FIG. 28 solves the problem described above. Two cases can be considered.

The first case refers to a method in which a location is fixed. When earthquake precursor occurs in a certain location, past earthquakes at the locations are investigated thoroughly. The method will be described with reference to an example case in which an event in which temperature and humidity have taken a specific pattern is determined as an earthquake precursor, and the location of the event is Tokyo. Investigation is carried out using the embodiment of FIG. 15 to obtain a count of how many times the temperature and humidity have taken the specific pattern in Tokyo. The count is now assumed as 10 times. Of the 10 times, an actual great-earthquake occurrence count is assumed as 5. With these values, the probability can be computed according to the following expression:

Probability of earthquake occurrence when the temperature and humidity in Tokyo have taken the specific pattern= $5/10=50\%$.

The second case is a method in which the location is not fixed. As described above, with reference to the example case using the temperature and humidity, observation data is limited even in the case of the temperature and humidity. As such, the method is arranged such that the location is not fixed, and investigation is similarly carried out using the 6th embodiment for events at which the temperature and humidity have taken a specific pattern. This enables the probability to be obtained according to the following expression, in which X represents the count of occurrences of the specific pattern and Y represents the count of great-earthquake occurrences after the specific pattern has taken place:

Probability of earthquake occurrence when the temperature and humidity in Japan have taken the specific pattern= Y/X.

A probability of past occurrence cannot be ensured to be the probability of current occurrence. Ordinarily, however, the methods as described above are carried out to obtain the probability. The baseball batting average is a typical teaching example. In the above, the larger the value of X, reliability in the probability is improved higher. As such, the probability of actual earthquake occurrence is handled as the same value as the value representing the probability of earthquake occurrence upon increase in the value of X up to a statistically significant level.

According to this embodiment thus arranged, since the probability in earthquake forecast can be computed, even more reliable earthquake forecast information can be provided.

<16th Embodiment>

Figure 30:
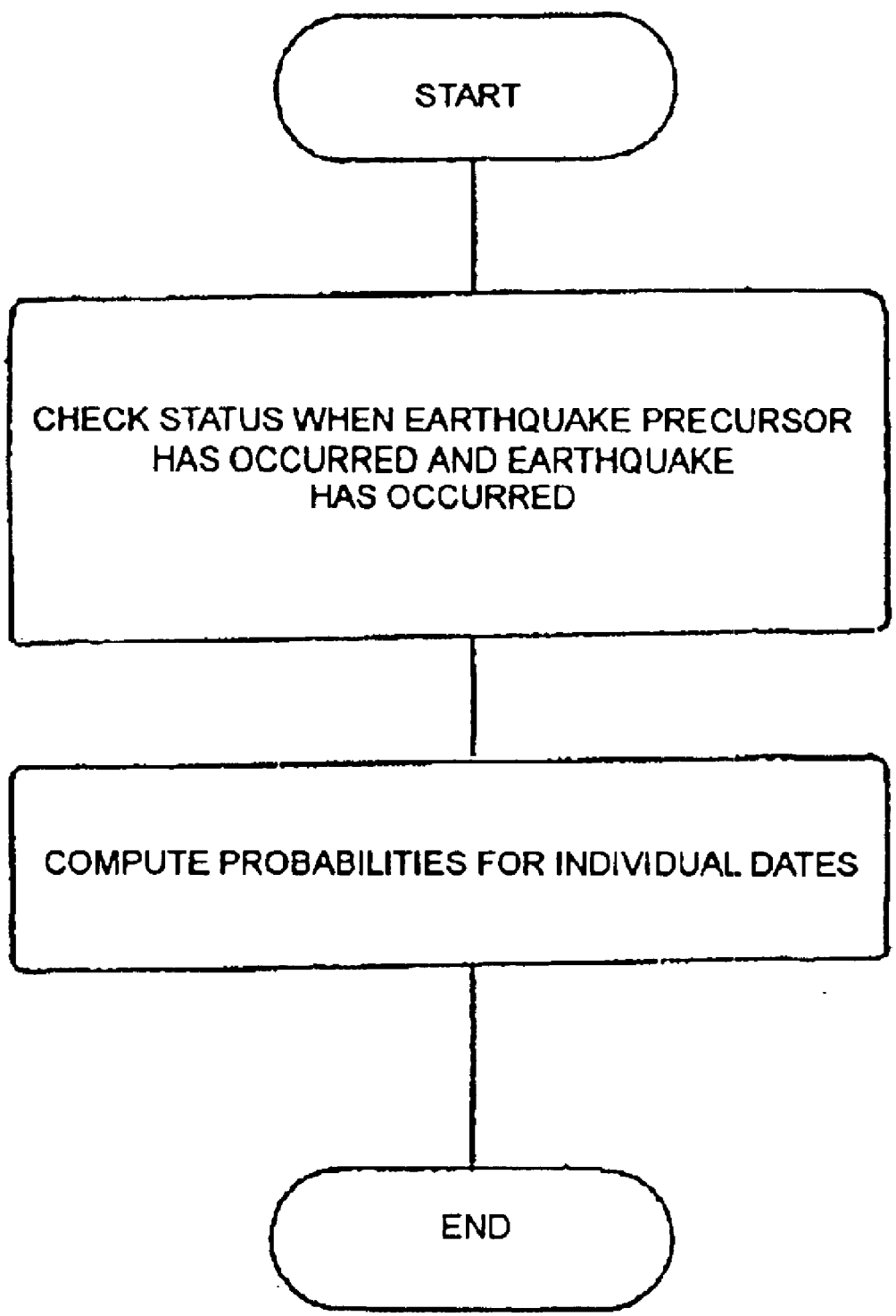
FIG. 30 is a view corresponding to a 16th embodiment of the present invention.

FIG. 30 shows steps to be processed by a geophysical data monitoring apparatus of the present invention. The present embodiment provides a geophysical data monitoring apparatus characterized in that computation is performed to obtain the probability of earthquake occurrence at a specified location after the appearance of a precursor of an earthquake forecasted to occur at the location, in units of either a date or a time span equivalent to the date. The expression "in units of either a date or a time span equivalent to the date" in the above means that although the unit is one day in principle, it may be, for example, 6 or 12 hours.

After the probability of whether an earthquake occurs has been known, what is subsequently desired to be known is "when the earthquake would occur". That is, in the case an earthquake is forecasted to "occur," the needs arise for knowing when preparation should be made therefor. Even when a forecast is notified, long-time preparation involves pain. However, the forecast would be very practical if it includes roughly forecasted occurrence date. Conventionally, also in this regard, despite the fact that necessities have arisen, no solution is yet presented. However, this problem is also solved through the present embodiment.

In principle, use of the embodiment as shown in FIG. 28 solves the problem described above.

The present embodiment is also arranged in the same fashion as described above with respect to the matter of whether the location is fixed. The present embodiment will be described with reference to the case where no location is fixed.

In the example of the embodiment of FIG. 29, the temperature and humidity in Tokyo takes the specific pattern 10 times. In addition, the count of actual great-earthquake occurrences out of the 10 times is 5. The result of investigation made for data regarding the 5 times is now assumed as follows:

First time: Earthquake after 9 days
Second time: Earthquake after 14 days
Third time: Earthquake after 9 days
Fourth time: Earthquake after 13 days
Fifth time: Earthquake after 10 days.

In this case, the probability is 2 times/5 times=40% for the events after 9 days. For the other events, the probability is 1 time/5 times=20%.

According to the present embodiment, since a roughly forecasted date when an earthquake would occur can be known according to the earthquake forecast, even more reliable earthquake forecast information can be provided.

<17th Embodiment>

The captioned embodiment provides a monitoring method characterized by including a step of computing the probability of whether an earthquake would occur and a step of outputting the computed result.

Since the computation methods have already been described in the embodiment of FIG. 29, an example output will be described in the present embodiment. FIG. 31 shows an example output of the present embodiment. While the example is intended for presentation in a Web page or electronic mail, it can be displayed on portable apparatuses, which can be brought with people, through some means. In addition, the data can be output on conventional TV sets and media of, for example, digital broadcast.

According to the present embodiment, since a roughly forecasted date when an earthquake would occur can be known according to the earthquake forecast, even more reliable earthquake forecast information can be provided.

<18th Embodiment>

In the present embodiment, an example output will be described since the computation method has already been described in the embodiment of FIG. 30. FIG. 32 shows an example output of the present embodiment. While the example is intended for presentation in a Web page or electronic mail, it can be displayed on portable apparatuses, which can be brought with people, through some means.

According to the present embodiment, since a roughly forecasted date when an earthquake would occur can be known according to the earthquake forecast, even more reliable earthquake forecast information can be provided.

<19th Embodiment>

Figure 33:
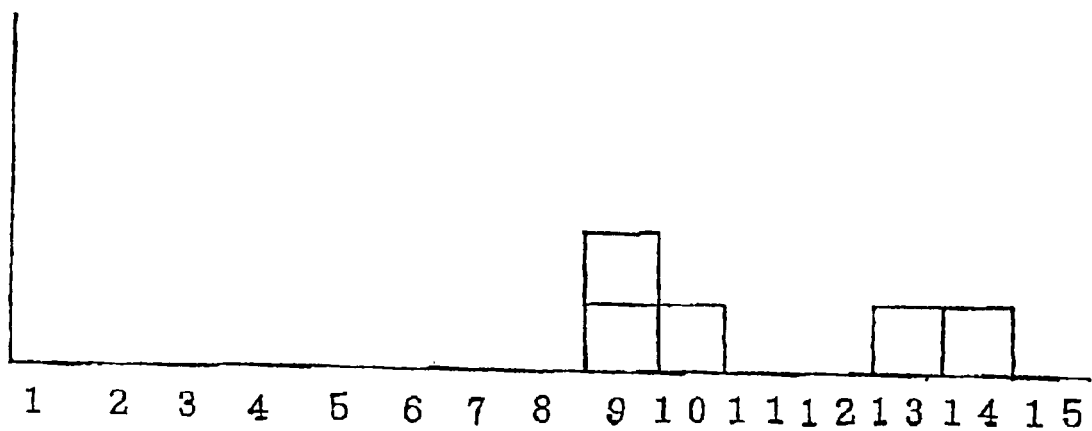
FIG. 33 is a view corresponding to a 19th embodiment of the present invention.

FIG. 33 shows an example output of the captioned embodiment. The present embodiment provides an earthquake monitoring method that presents an earthquake occurrence probability in accordance with an occurrence frequency in units of either a date or a time span equivalent to the date.

The embodiment of FIG. 32 digitizes the probability and thereby represents it. However, in view of improvement in visual characteristics, a histogram is easier to understand. In the example output produced as shown in FIG. 33, it is easy to recognize that the period from the 9th to the 14th is indicated to be dangerous, and no occurrence case is present on and before the 8th.

According to the present embodiment, since an earthquake occurrence date in the earthquake forecast can be visually recognized, forecast information can be provided in the form that is even easier to understand.

<20th Embodiment>

Figure 34:
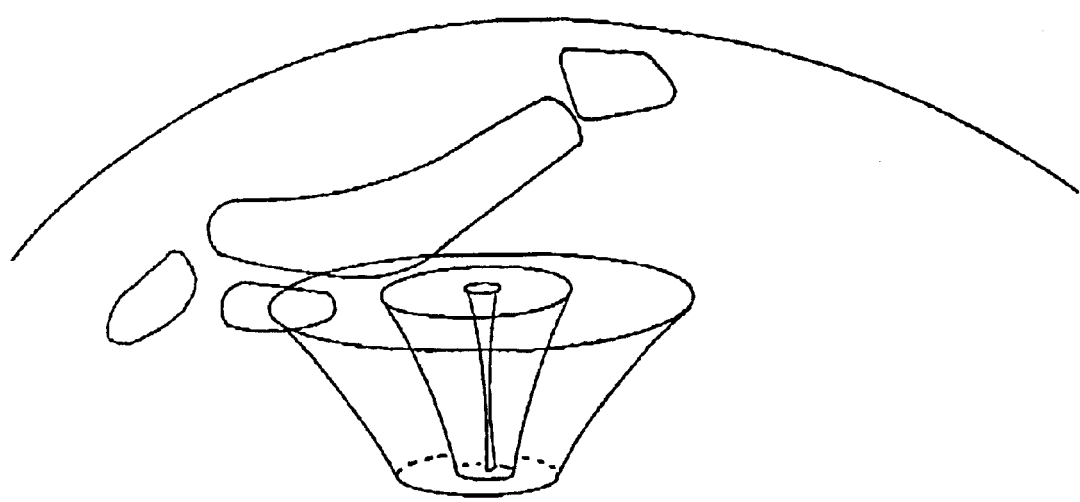
FIG. 34 is a view corresponding to a 20th embodiment of the present invention.

The captioned embodiment provides a monitoring apparatus that three-dimensionally displays a location where an earthquake is forecasted to occur and the number of days before the occurrence of the earthquake. FIG. 34 shows an example output of the present embodiment.

The course of a typhoon is shown by forecast circles. Specifically, the forecasted course is shown over a two-dimensional plane with a margin. Similarly, the earthquake is schematically represented in a course-wise image in consideration of the probability and taking into consideration that the earthquake "comes from an underground site". Methods available in this field ranges from those with a relatively long time margin before the occurrence of an earthquake to those with no time margin before the occurrence of an earthquake. The arrangement may be made such that the display is carried out using a method with a relatively long time margin, and a plurality of methods are combined, whereby the accuracy is gradually increased for, for example, the earthquake occurrence location, the number of days, and the magnitude scale. Typhoon forecasts are reported by providing corrections as the course advances. Also for earthquakes, using a concept similar to the above, it is essential to epitomize obtained information.

In this view, although KURUDAS provides display presentation over the two-dimensional plane, the presentation can be called a "three-dimensional KURUDAS".

According to the present embodiment, since an earthquake occurrence location in the earthquake forecast can be visually recognized, forecast information can be provided in the form that is even easier to understand.

<21st Embodiment>

The captioned embodiment represents the forecasted number of days before the occurrence of an earthquake in the form of a depth over a map.

Figure 35:
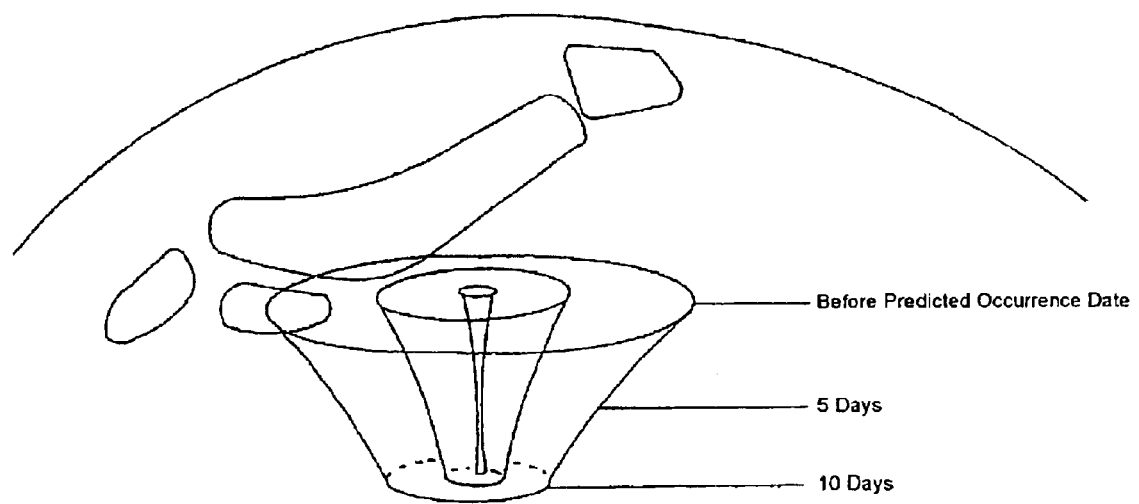
FIG. 35 is a view corresponding to a 21st embodiment of the present invention.

FIG. 35 shows an example output of the present embodiment. The forecasted number of days before the occurrence of an earthquake is represented by the depth.

According to the present embodiment, since the number of days before the occurrence of an earthquake and a location in the earthquake forecast can be visually recognized, forecast information can be provided in the form that is even easier to understand.

<22nd Embodiment>

Disclosed in the captioned embodiment is an example configuration that uses an inter-remote-site communication via any one of a public line, a mobile communication line, the Internet line, a satellite line, a leased line, and an arbitrary combination thereof.

FIG. 36 shows a monitoring apparatus of the embodiment. In this case, geophysical data is fetched via a public line 230, and the output is delivered to, for example, a personal computer and an Internet-connectable cellular telephone. In this example, an output device 19 plays the roll of a Web server.

According to the present embodiment, communication with remote places can easily be implemented. Further, connection to the line enables various remote processes to be automatically implemented.

<23rd Embodiment>

In the captioned embodiment, resultant data of earthquake forecast is output in the form of electronic mail. FIG. 37 shows an example of electronic mail according to the present embodiment.

The example shows, in addition to the three factors of earthquake forecast, namely, the location, time, and magnitude scale, probabilities of earthquake occurrences in the case where a precursor has occurred in the location, and occurrence-date distribution in the case of occurrences.

According to the present embodiment, an earthquake forecast can easily be known.

<24th Embodiment>

In the captioned embodiment, resultant data of earthquake forecast is output in the form of a Web page. FIG. 38 shows an example Web page according to the present embodiment. The contents of basic information are the same as those of the embodiment of FIG. 37.

According to the present embodiment, a current forecast can easily be known any time when an earthquake forecast is desired.

<25th Embodiment>

In the captioned embodiment, the Web page cannot be viewed unless authentication items for verifying an authenticated user is input. FIG. 39 shows an example Web page according to the present embodiment. In nature, an earthquake forecast has an aspect in which it is not preferably opened on a Web page. As such, the arrangement is made such that a screen presenting forecast information cannot be viewed unless an ID name and a password are input.

According to the present embodiment, only a preregistered user is authenticated to view a current forecast information.

<26th Embodiment>

Figure 1:
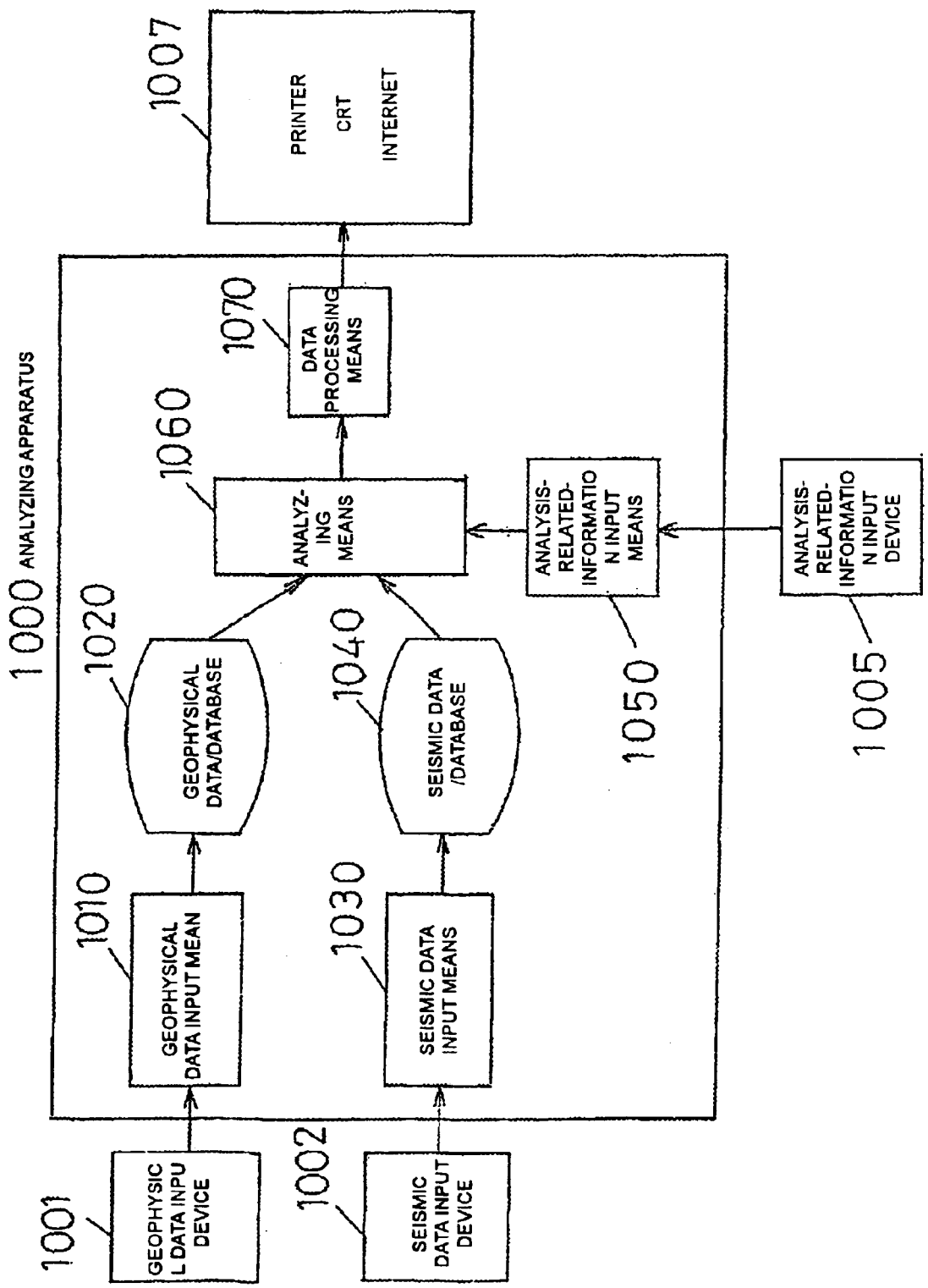
FIG. 1 is a view showing an example configuration of an analyzing apparatus according to the present invention.

The captioned embodiment is a combination of the embodiment of FIG. 10 and the embodiment of FIG. 1. As geophysical data, "atmospheric temperature" is used.

According to the present embodiment, only a preregistered person is authenticated to view current forecast information.

<27th Embodiment>

In the captioned embodiment, a portable receiving apparatus, which can be brought with a receiving user, receives resultant data of earthquake forecast. FIG. 40 shows portable receiving apparatuses usable in the present embodiment. Shown in the drawing are, for example, a cellular phone/PHS, a "pocket bell" communication apparatus, a watch, a pendant, an electronic pocket notebook/PDA, and a small personal computer.

The present embodiment is advantageous in that earthquake forecast information can be obtained from any location.

<28th Embodiment>

Figure 41:
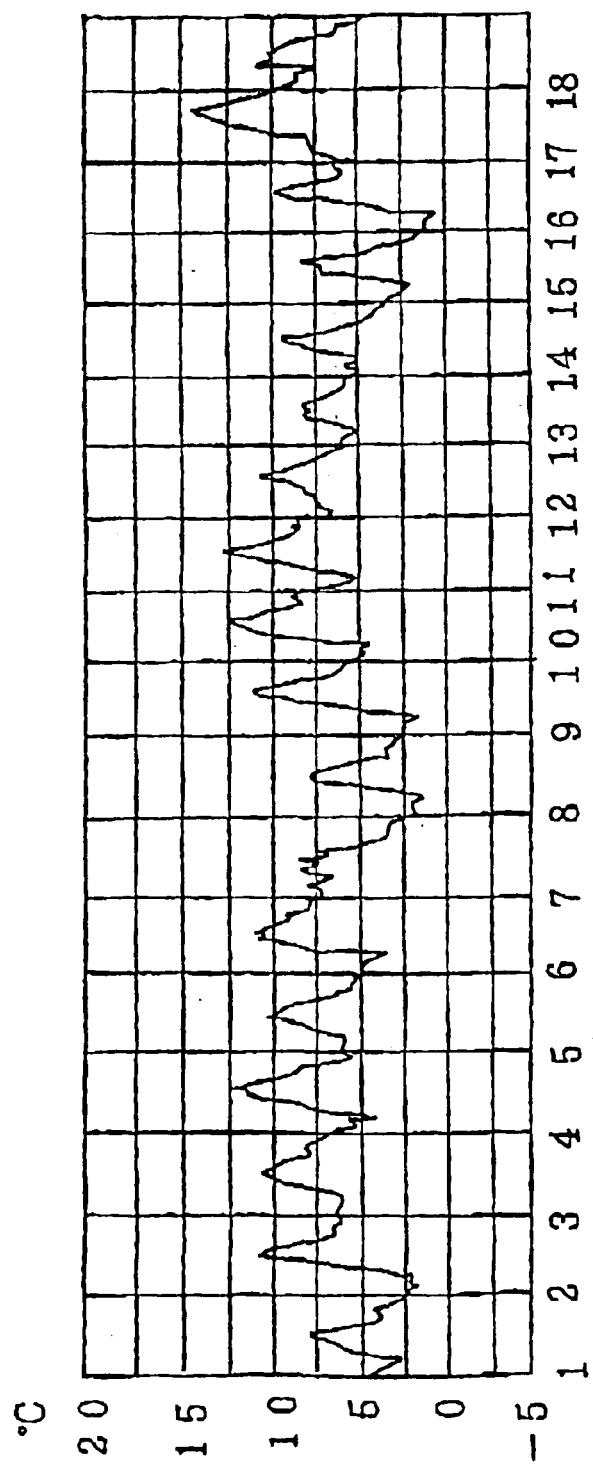
FIG. 41 is a view corresponding to a 27th embodiment of the present invention.

Before reading description regarding the captioned embodiment, refer to FIG. 41. The drawing shows atmospheric-temperature transitions which occurred in Kobe in January 1994. The dates are segmented by 24 o'clock, in which about 6 hours in each of the front and behind parts can be said to be nighttime. In this case, 24 o'clock is midnight; and as a matter of course, the atmospheric-temperature transition generally takes a right-descending pattern as the air grows cold toward the break of dawn. While right-some ascending portions where the atmospheric temperature is around 1° C. can also be found, no remarkable things are observed therein.

Subsequently, please refer to FIGS. 42 and 43. The drawings each show atmospheric-temperature transitions which occurred in Kobe in January 1995. A remarkable point appears in a time zone of from January 3 to 4. Generally, the atmospheric temperature goes down; however, the temperature is monotonically rising.

Such temperature rise can be considered to be a precursor of the great earthquake. The reason is that such rises in earth-surface temperature before great-earthquake occurrences in, for example, Japan, the USA, Russia, and China have been reported. In many cases, the earth surface temperature is measured using a technique called remote sensing from a satellite. Inherently, however, the atmospheric temperature is the temperature at a point 1.5 m above the ground. As such, the earth surface temperature and the atmospheric temperature can be considered to have variation tendencies similar to each other.

Figure 43:
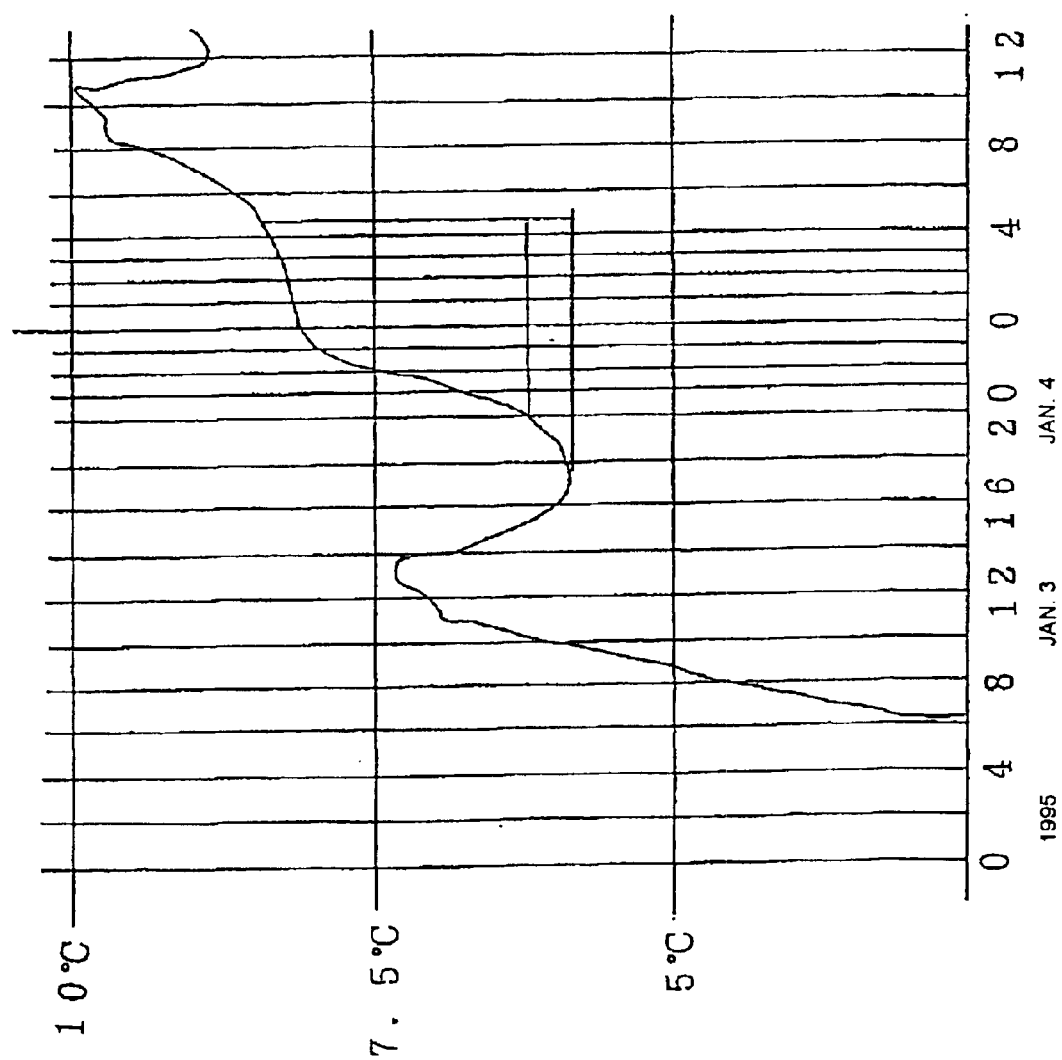
FIG. 43 is a third view corresponding to the 27th embodiment of the present invention.
Figure 44:
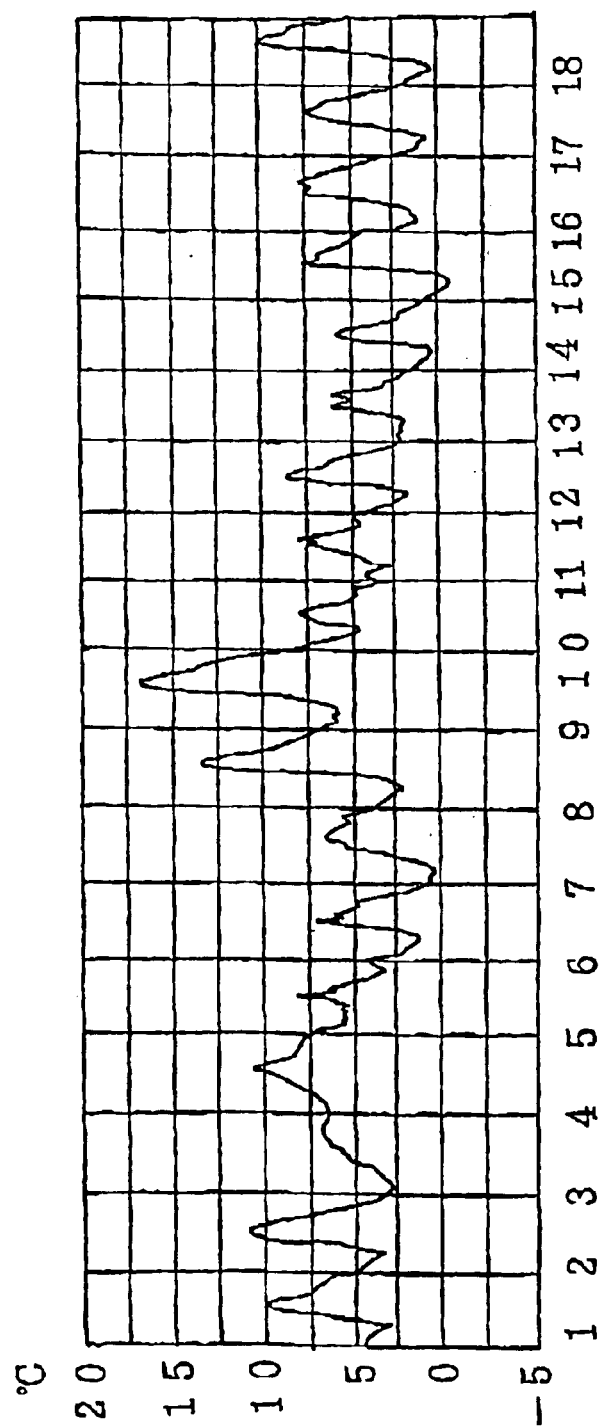
FIG. 44 is a fourth view corresponding to the 27th embodiment of the present invention.

Please refer to FIG. 44. The drawing shows atmospheric-temperature transitions which occurred in Hiroshima in January 1995. Compared to FIGS. 42 and 43, the variation tendency can quickly be understood to be very similar thereto. However, it can also be interpreted that while the variations exhibit a descending tendency during a time zone of from 20 o'clock to 24 o'clock when the date is changed from January 3 to 4 during which anomalies occurred in Kobe, the temperature has a somewhat ascending tendency after 24 o'clock.

What can be known from the above are summarized hereunder:
1. No anomalies are observed in the atmospheric temperature data of Kobe during January 1994; and
2. Anomalies are observed in the time zone in which the date changes from January 3 to 4 in the atmospheric temperature data of January 1995 in Kobe.

That is, while, generally, the temperature decreases monotonically after sunset, the temperature during that time zone in Kobe exhibited an ascending tendency as an anomalous phenomenon.
3. Anomalies are somewhat observed in a time zone of from January 3 to 4 in the atmospheric temperature data of January 1995 in Hiroshima.

That is, the atmospheric temperature rose within a range of 1° C. or less even after 24 o'clock. However, it can be recognized that no specific anomalies occurred.

A geophysical data monitoring apparatus of an embodiment shown in FIG. 45 will now be described hereunder.

Firstly, the configuration will be described referring to FIG. 45. The monitoring apparatus is configured to include atmospheric-temperature data input means that inputs atmospheric temperature data of a plurality of locations via an atmospheric-temperature data input device; data processing means that adds position information of a location where the atmospheric temperature data has been detected to the atmospheric temperature data, that correlates the atmospheric temperature data to the position information, that stores atmospheric temperatures in the individual locations at arbitrary time after sunset, and that performs arithmetic processing to obtain nighttime atmospheric-temperature transition amounts in accordance with the stored atmospheric temperatures; and output means that outputs the processing result to an output device.

Figure 45:
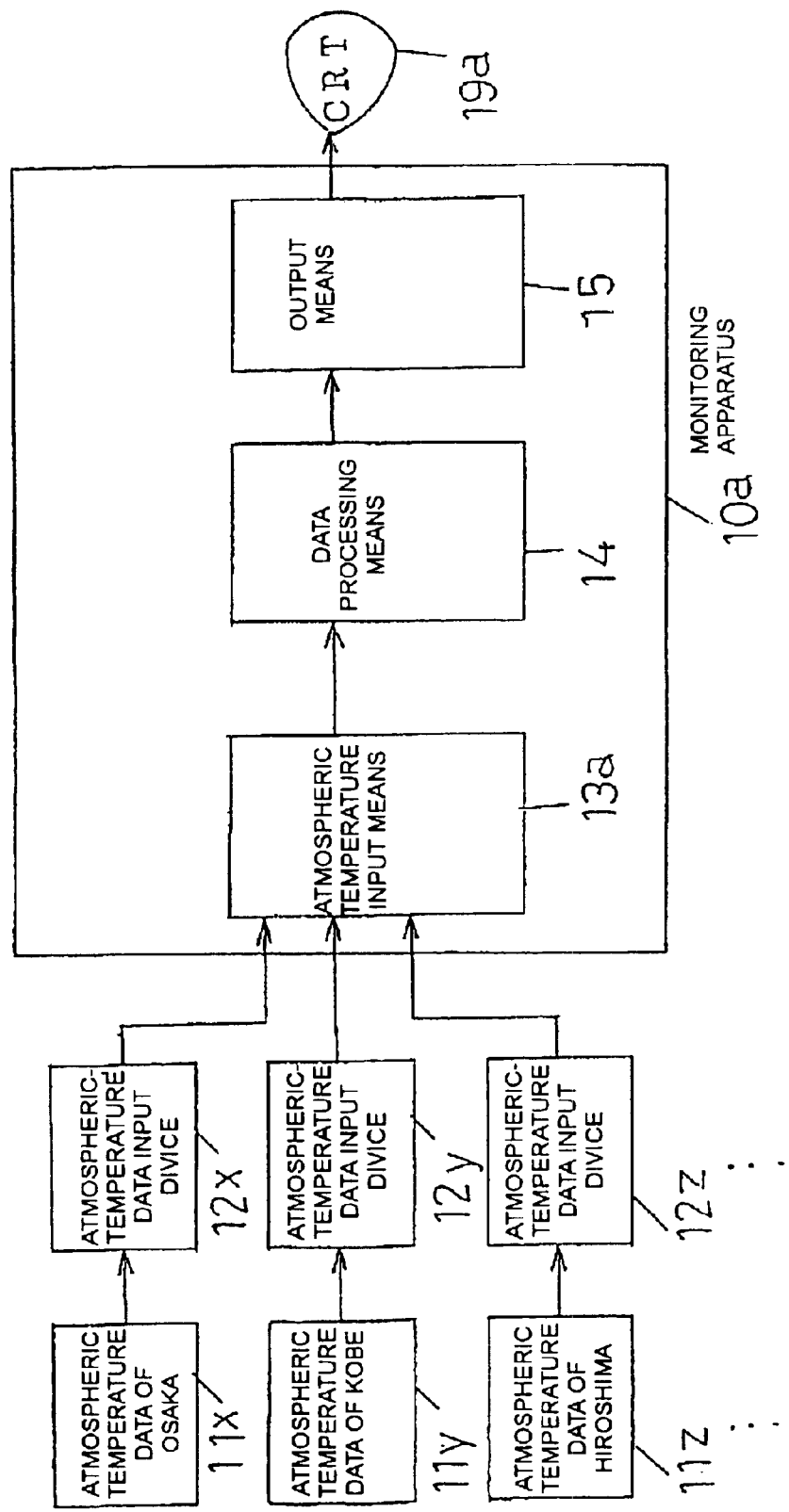
FIG. 45 is a fifth view corresponding to the 27th embodiment of the present invention.

FIG. 45 is a view in which the portions shown for the electromagnetic wave in FIG. 12 are just replaced by those for the atmospheric temperature.

Figure 46:
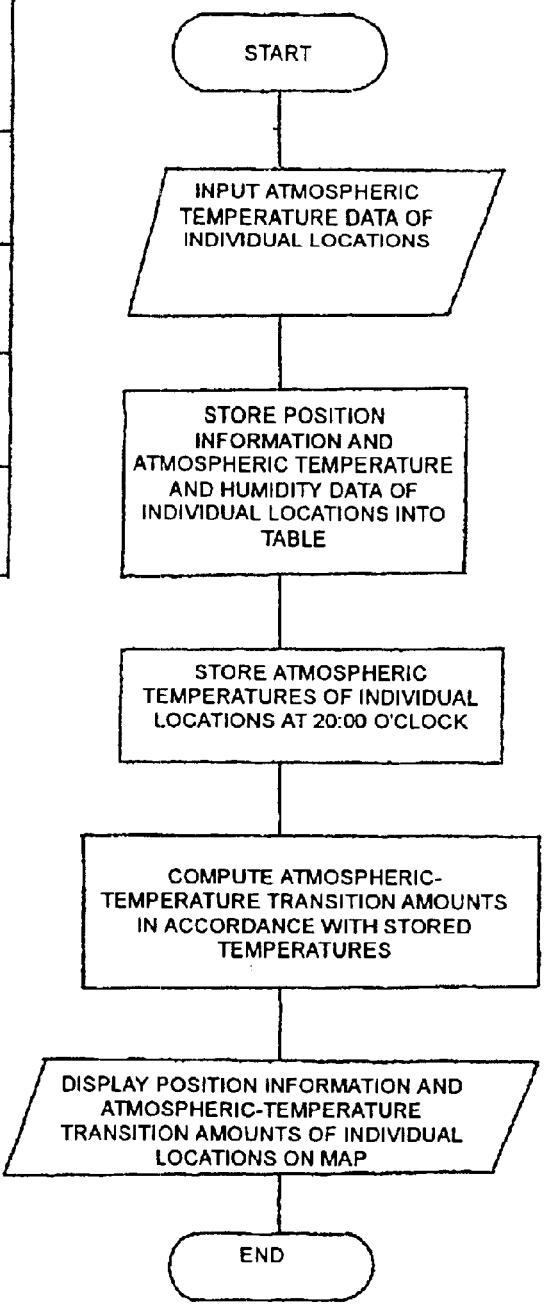
FIG. 46 is a sixth view corresponding to the 27th embodiment of the present invention.

FIG. 46 shows the flow of input/processing/output.

Firstly, atmospheric temperature data of individual locations are input, and position information and atmospheric temperature data of the individual locations are stored into a table in a computer. In this case, as the atmospheric temperatures after sunset, the atmospheric temperatures at 20 o'clock are used.

The atmospheric temperatures at 20 o'clock are stored, and comparative operations are performed with the atmospheric temperatures at 20 o'clock with reference to the atmospheric temperatures at 20 o'clock. Thereby, atmospheric-temperature transition amounts are produced at final. The atmospheric-temperature transition amount is expressed by the following expression:

Atmospheric-temperature transition amount=Total of (elapsed time×varied temperature from reference value)

Figure 42:
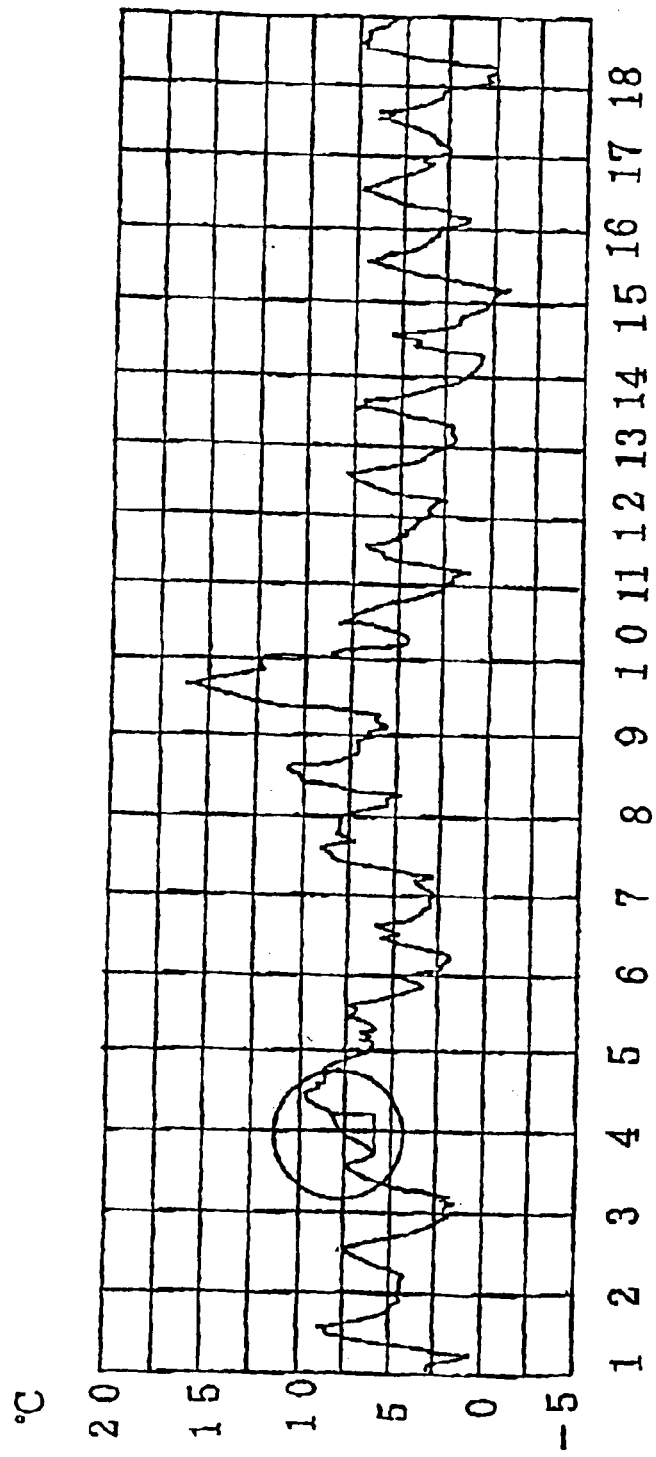
FIG. 42 is a second view corresponding to the 27th embodiment of the present invention.

For example, in a period of from 20 o'clock on January 3 to 04 o'clock of January 4 shown in FIGS. 42 and 43, the atmospheric-temperature transition amounts are arithmetically operated with the following result:

Atmospheric-temperature transition amount=0.3+1.3+ 1.7+1.8+1.9+2.0+2.0+2.1=13.1 (° C.·h)

The operated atmospheric-temperature transition amounts are conversely stored in the table and are displayed on a map in a two-dimensional plane.

In accordance with the configuration, method, and atmospheric temperatures described above, display can be implemented in the form of a KURUDAS screen.

According to the present embodiment, a location at which an earthquake is forecasted to occur due to a nighttime temperature variation can be displayed on the map.

<29th Embodiment>

Figure 47:
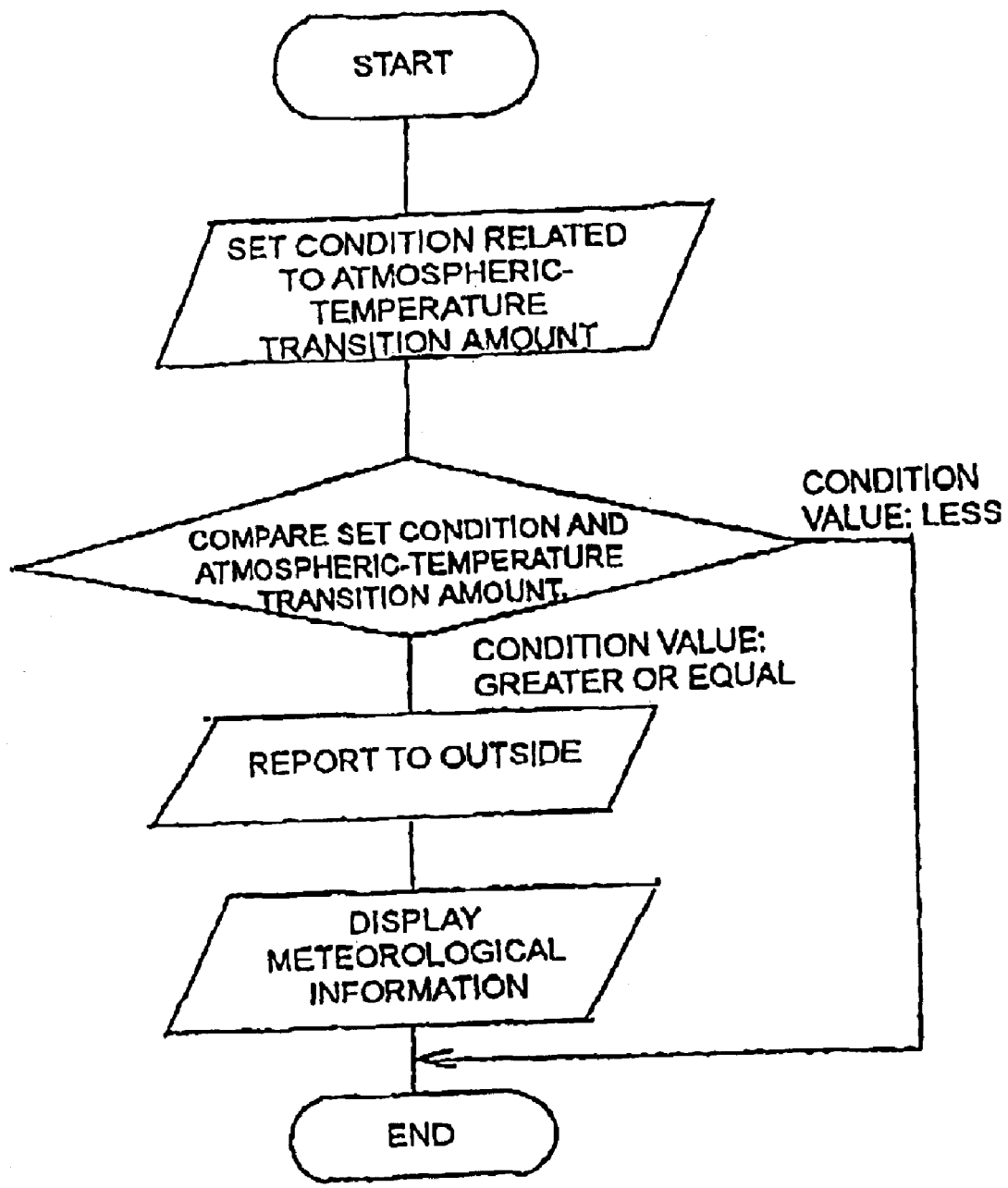
FIG. 47 is a view corresponding to a 28th embodiment of the present invention.

Referring to FIG. 47, a description will be provided hereinbelow regarding the captioned embodiment configured by adding other functions to the geophysical data monitoring apparatus.

The embodiment has reporting means, in which an atmospheric-temperature-variation detection condition is preliminarily set using atmospheric-temperature condition setting means; and when the atmospheric temperature has exceeded the set atmospheric temperature, the reporting means outputs a report saying to that effect to the outside. The report to be output to the outside may be output not only to, for example, a CRT and a printer, but also to electronic mail and a Web page.

Further, in this case, the embodiment is arranged to include meteorological-information display means, in which a report of information of wind directions and forces are together output as meteorological information. This arrangement is made for the reason that the temperature rises during nighttime because of factors other than an earthquake. For example, the temperature can rise in cases where a north wind before nighttime is changed to a south wind in nighttime, and a warm front passes. As such, in practice, information in the form of, for example, weather charts is indispensable for identification. Meanwhile, with the Internet system being used, a URL of a Web page can be written into mail for prompting the reference.

As described above, in FIG. 45, it is not indispensable to concentrically exist in FIG. 45.

According to the present embodiment, nighttime atmospheric-temperature variations can be known by, for example, electronic mail. Further, the embodiment enables information as to whether or not the temperature rise is caused by an earthquake to easily be known.

INDUSTRIAL APPLICABILITY

As described above, the present invention significantly contributes to solving the following two problems:
(1) Implementation of what analyzes correlations between geophysical data and seismic data; and
(2) Implementation of what displays a location where an earthquake would occur.

For (1), the analysis technique called "Genomatic Research" is proposed, thereby enabling geophysical data and seismic data to be organically correlated to each other so that the analysis of the correlation therebetween is accelerated.

Specifically, the present invention offers advantages in that, for example, correlations between various geophysical data and an earthquake can be efficiently analyzed, even a large volume of data can be searched without causing a problem, and an "algorithm considered effective" can be efficiently searched for or modified.

For (2), "KURUDAS" for indicating an earthquake occurrence location is proposed that significantly contributes, particularly, to the forecast of "where" of the three earthquake forecast factors "when", "where", and "how large an oncoming earthquake would be". In addition, probabilities are employed as indexes. Thereby, for example, the probability of the occurrence of an earthquake itself in the forecasted location can be forecasted; and if an earthquake occurs, the probability can be forecasted in units of a date on which the earthquake would occur at the location. Further, the information of the forecasts can be provided. While not having been practically applied before to earthquake forecast, the apparatus and the method that are proposed this time offer advantages in that solutions can be secured for the earthquake forecast that has a accuracy and is to be practically used.

What is claimed is:

1. A geophysical data monitoring apparatus comprising:
   a geophysical data input means for inputting atmospheric temperature data of a plurality of locations as geophysical data of the plurality of locations via a data input device;
   an atmospheric-temperature-data/position-information correlating section for performing processing that adds position information of one of the plurality of locations to the atmospheric temperature data of the one of the plurality of locations, and correlates the atmospheric temperature data of the one of the plurality of locations to the position information of the one of the plurality of locations;
   an atmospheric-temperature comparing section that compares an atmospheric temperature of the one of the plurality of locations at an arbitrary time after sunset with an expected nighttime temperature of the one of the plurality of locations; and
   an output means for adding a processing result of the atmospheric-temperature data/position-information correlating section to a processing result of the atmospheric-temperature comparing section, and for outputting a result thereof to an output device.

2. A geophysical data monitoring apparatus according to claim 1, further comprising:
   a reporting means for providing a report when the processing result of the atmospheric-temperature comparing section exceeds a predetermined condition; and
   a meteorological-information display means for providing a report of meteorological information.

3. A geophysical data monitoring apparatus according to claim 1, wherein the output means is operable to perform image processing that represents processing results of the atmospheric-temperature-data/position-information correlating section and the atmospheric-temperature comparing section in the form of graphical information on a map.

4. A geophysical data monitoring method comprising:
   acquiring atmospheric temperature data of a plurality of locations as geophysical data of the plurality of locations via a geophysical data input means;
   adding position information of one of the plurality of locations to the atmospheric temperature data for the one of the plurality of locations;
   correlating the atmospheric temperature data for the one of the plurality of locations to the position information for the one of the plurality of locations;
   comparing the atmospheric temperature of the one of the plurality of locations at an arbitrary time after sunset with an expected nighttime temperature of the one of the plurality of locations; and
   adding a processing result of said correlating to a processing result of said comparing, and outputting a result thereof to an output device.

5. A geophysical data monitoring method according to claim 4, further comprising:
   providing a report when a processing result of said comparing the atmospheric temperature of the one of the plurality of locations at an arbitrary time after sunset with an expected nighttime temperature of the one of the plurality of locations exceeds a predetermined condition; and
   displaying meteorological-information.

* * * * *